3,138,782
PUNCHED CARD TO INTERNAL STORAGE
TRANSLATOR WITH PARITY CHECK
Eugeni Estrems, Saint-Mande, and Maurice Papo, Paris, France, assignors to International Business Machines Corporation, New York, N.Y., a corporation of New York
Filed Dec. 23, 1957, Ser. No. 704,779
4 Claims. (Cl. 340—172.5)

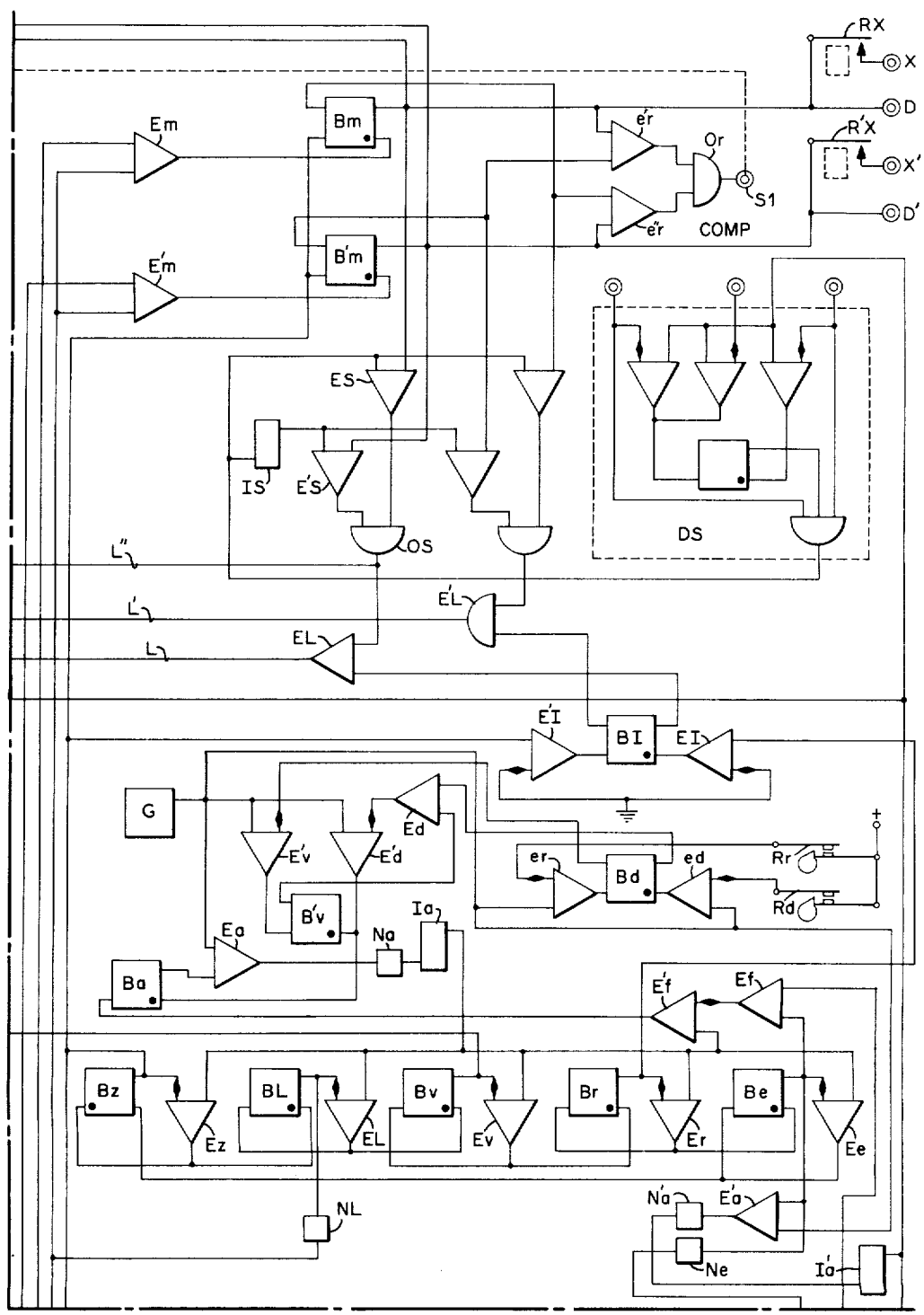
FIG_4c_

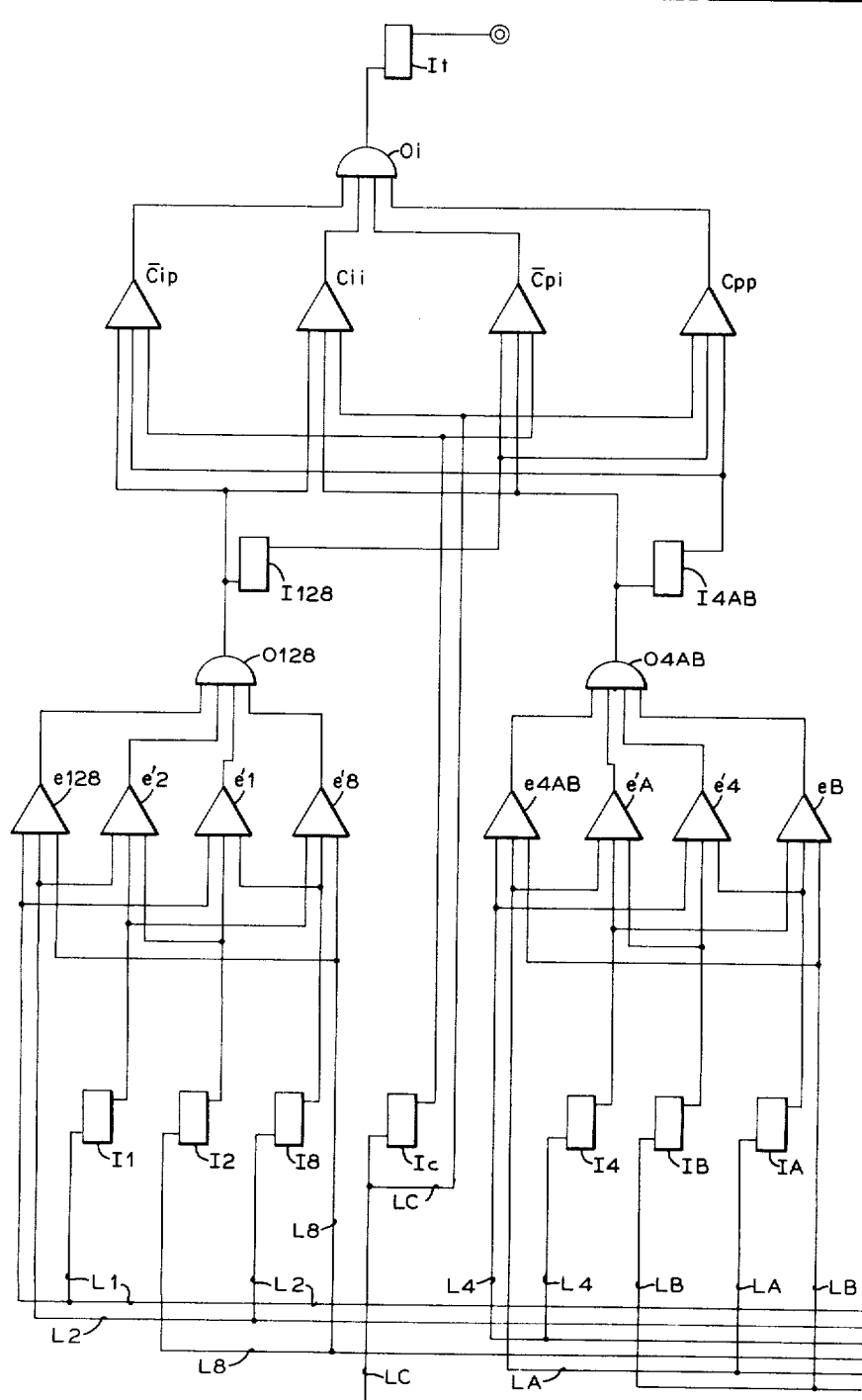
FIG_4d.

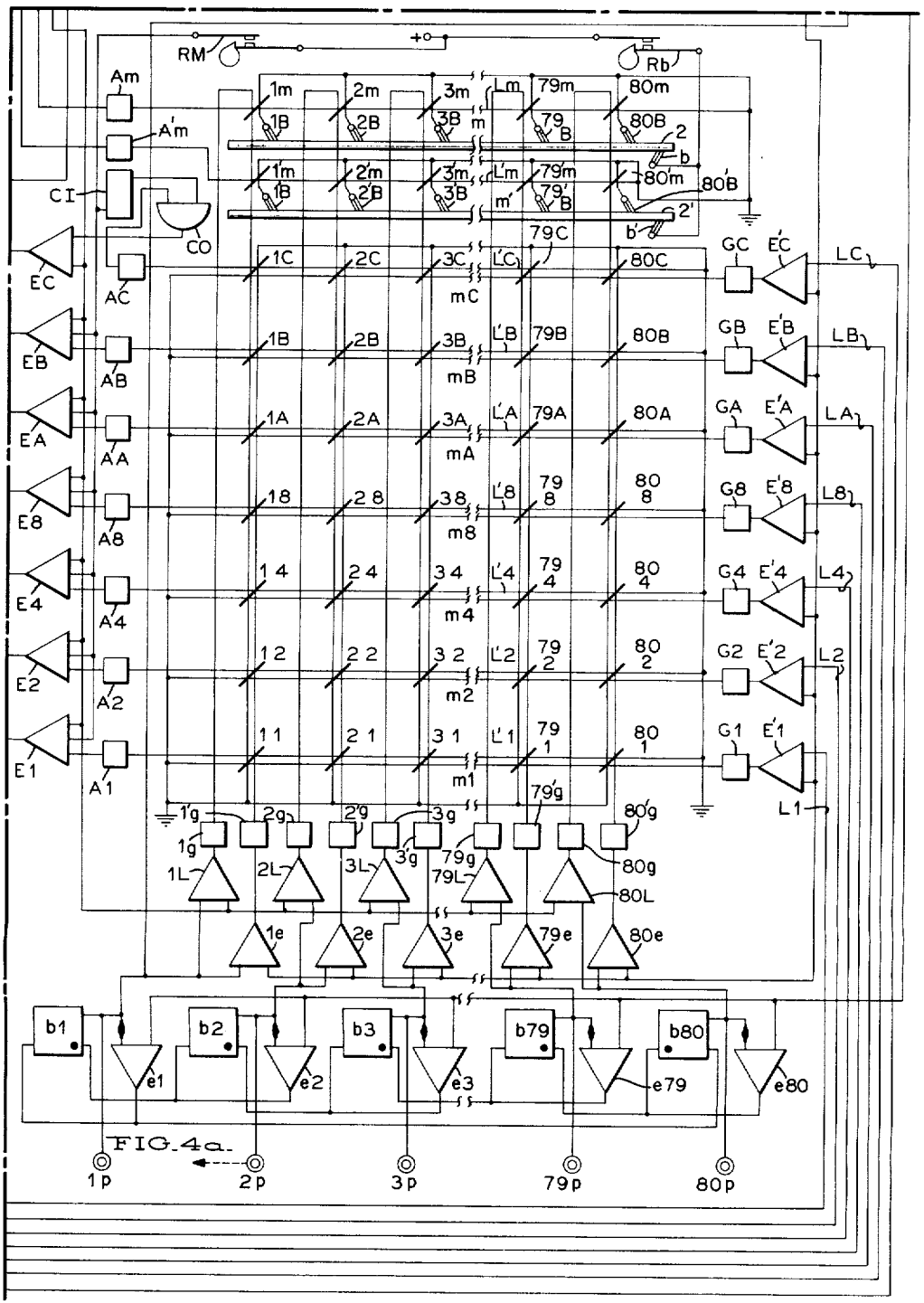
FIG_4f_

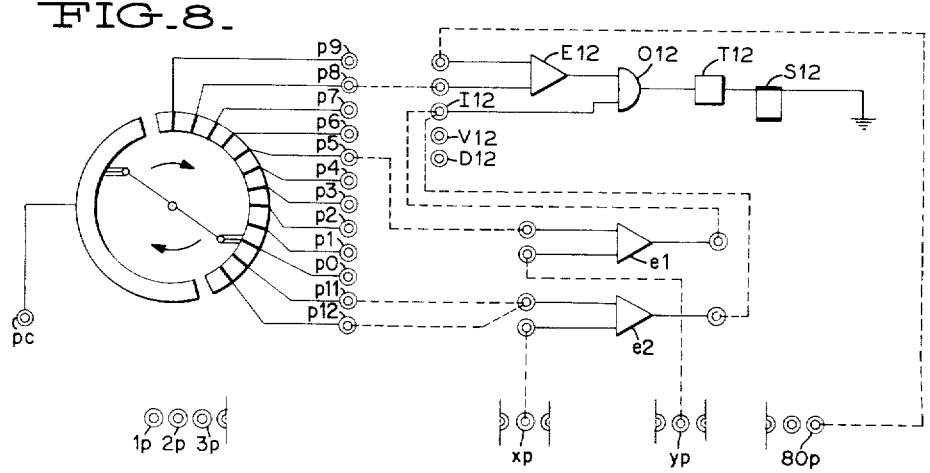
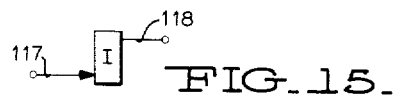
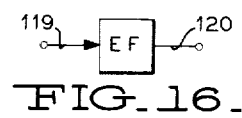
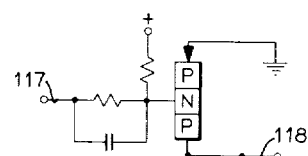
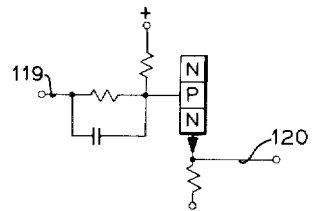
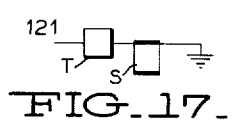
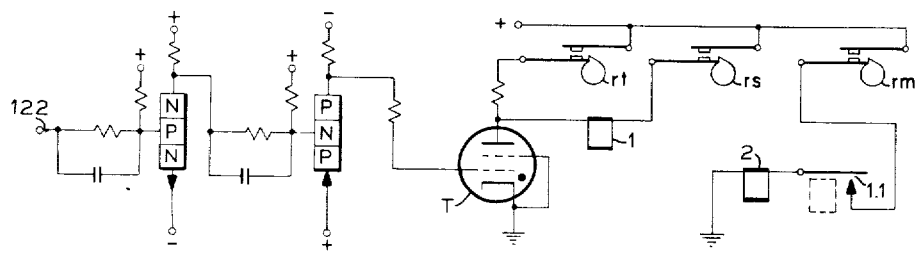

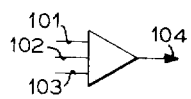
FIG_9_
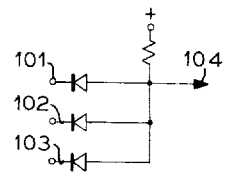
FIG_9a_
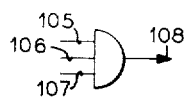
FIG_10_
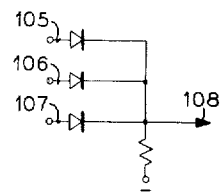
FIG_10a_
FIG_11_
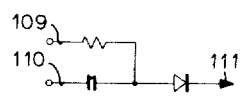
FIG_11a_

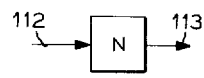
FIG_12_
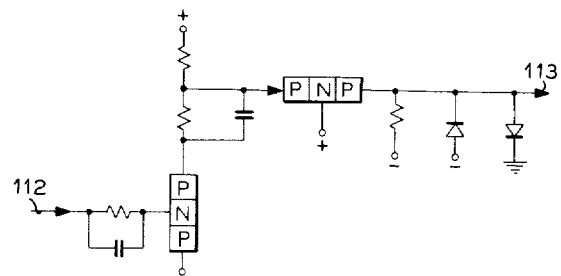
FIG_12a_
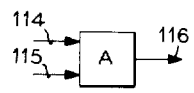
FIG_13_
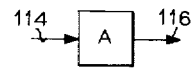
FIG_13b_
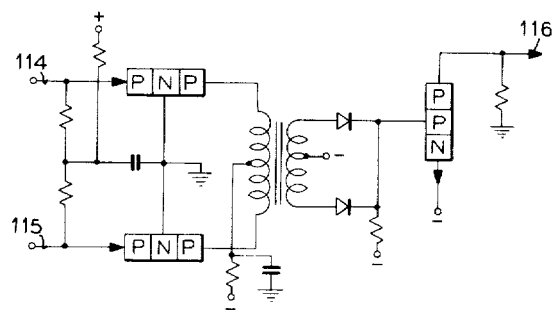
FIG_13a_
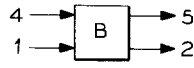
FIG_14b_
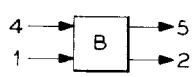
FIG_14_
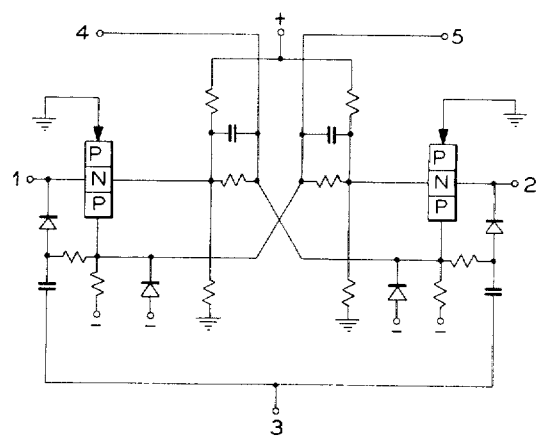
FIG_14a_

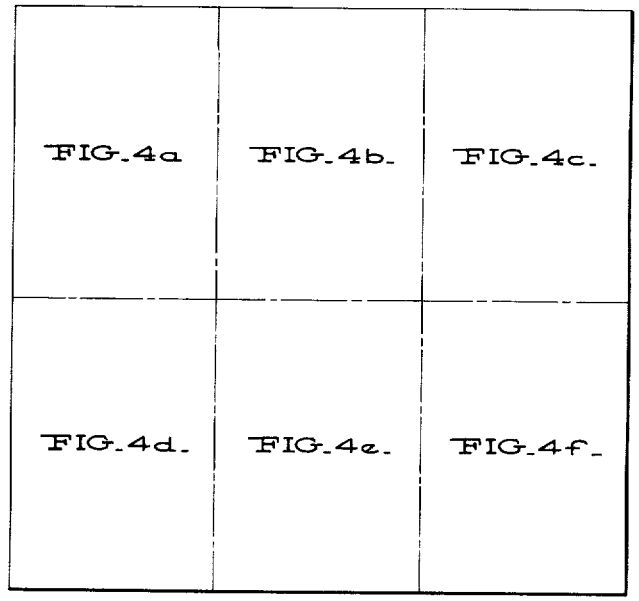
FIG_18.
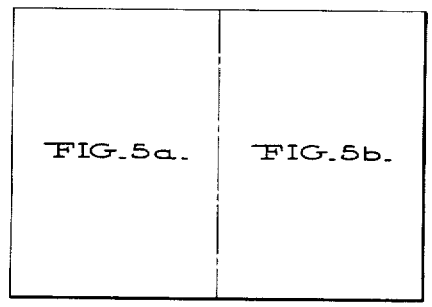
FIG_19.

This invention relates generally to data reading devices, and more particularly to a device designed to read data represented by perforations punched in a record card.

This invention is useful in tabulating, accounting, computing machines, etc., and more particularly to input and output devices controlled by punched cards.

The present embodiment of the reading device of this invention provides for the entry of data punched in a record card into storage units so that the stored data is a coded image of the contents of the card. In the present embodiment of the invention, the reading, or storage entry, device performs the following functions:

(1) Scanning (i.e., reading) the data punched in the card by one or several sets of brushes.

(2) Writing (i.e., entering) the data so scanned into one or several intermediate memories.

(3) Selection of a particular field of a card among several fields.

(4) Checking the information read through an improved process by which the total number of perforations sensed by a first set of brushes is compared with the total number (i.e. modulo 16 or 32) of perforations sensed by a second set of brushes.

(5) The comparison of data from determined fields of two successive cards.

(6) Control selectors the energization of which may be started by:

(a) A given perforation in a card.
(b) The sensing of an inequality comparison, that is, when an inequality has been detected during a comparison between data from any two fields of two successive cards.
(c) The results of a calculation, for example, the sign.

(7) Translating from the code used in the punched cards to that used in main memory.

(8) The following automatic checking:

(a) The check of the coder or translator itself.
(b) The redundancy check after translation.
(c) The sensing of columns bearing invalid multiple perforations.
(d) The sensing of blank columns.

(9) Improved control for recording in main memory. Data entered in main memory remain stored during the time interval between the run of the last row of the card past the read brushes and that of the first row of the next card. It is during this time interval between two read cycles that the machine performs all desired operations: computing, printing, punching, etc., so that at the completion of this time interval, the device has performed this control.

(10) Clearing the data previously entered to prepare of the reading process for the next card.

The input system thus provides advantageous performance of all these functions in a simple, rapid and economical way.

According to the present embodiment of the invention, data punched in a row of a conventional card are sensed simultaneously by 80 brushes and entered in parallel in an intermediate memory converted into electronic signals serially developed in a single line and successively entered in a main magnetic memory after a translation; concurrently a second set of 80 read brushes senses the data from a second card moving in synchronization with the first and enters this data into a second intermediate memory whereby recording, comparison and checking of the sensed data are performed simultaneously by rows and columns.

Each intermediate memory serves as a parallel-to-serial converter such as described in the copending application of E. Estrems, Serial No. 694,638, filed November 5, 1957, now Patent No. 3,008,126. Other types of such parallel-to-serial converters are known and shown, for example, in U.S. Patent No. 2,718,356. According to this patent, each of the 80 brushes is connected to one input of 80 logical AND circuits, 80 scanning pulses are applied successively to the second input of each of these AND circuits, and the outputs of these circuits are grouped through logical OR circuits so that all the data is developed serially on a single output line.

This invention also relates to the applications of parallel-to-serial converters to verification, checking and comparing.

In a particular embodiment of the present invention designed to be used with punched cards in a conventional manner, the information is read from the card in 12 steps corresponding to the 12 rows of the card. On each of these 12 steps, 80 brushes read the 80 positions of one row to store the information so read into an intermediate memory comprising 80 magnetic cores. These magnetic elements have two stable states respectively characterized by a positive or negative remanent induction. On one of these 12 steps, these 80 elements, correspond to the 80 locations of one row, and on the next step these elements correspond to the 80 locations in the next row and so on. Each magnetic core bears windings to induce a magnetic field that drives it from one magnetic state to the other in order to record therein the information or to send a signal when the magnetic core shifts from one state to the other in order to read the information. The latter then is directed into selector control and hold devices, control break detection devices, field selection devices, check devices and translation devices for translating the code used in the card into a 7-position code. Then, the information is entered in the main memory.

The card may be fed either 9 edge or 12 edge first so that, successively on every one of the 12 steps, all the 80 positions of a row are read out and entered in the intermediate memory. However, the description will be limited to the case where the card is advanced 9 edge first.

In the present example, the data read from the cards is entered directly into the intermediate memory. It is not necessary then to link the 80 brushes to terminals on the control panel of the machine.

An object of this invention is to provide an improved code translator.

Another object is to provide an improved checking of a code translator.

Another object is to provide an improved checking device.

According to a preferred embodiment of the invention, data entered in memory during one step are read out during a second step and combined with the data then read by the brushes so as to take into account code changes that could develop through the combination of information previously read with that just read, after which the information or data are regenerated in the memory. This regeneration permits the handling of perforations which express different data according to whether they are single or combined with another perforation and the taking of them into account for code conversion. For example, a perforation in row 0 of a card expresses either a number digit 0 or a letter or else a special character through its combination with one or several other perforations.

Common core drivers may be used for driving the cores of both the intermediate memories and the main memory with the operation that data from the main memory are read out with the data from the two intermediate memories after the scanning of each row of the card and then the data from main memory entered back therein with data from one of the intermediate memories. This process is repeated until the last row of the card, and at that time, the entire information punched in the card has been entered in the main memory.

The code conversion is performed by means of a coder or translator. The coder receives a signal indicating the value assigned to the row being sensed, signals from the intermediate memory due to the presence of perforations in this row and signals from the main memory indicating the perforations sensed during previous row sensings. The first two provide for the entry in the main memory of the information contained in the row being scanned and the third signals provide for the re-entry into the main memory of the data which had been previously entered therein.

The signal indicating the value assigned to the row being sensed may be introduced into the coder through electro-mechanical contacts or by electronic circuits in synchronization with the advance of the card.

Between the sensing of the last row in the card and that of the first one in the next card, data entered in the main memory are read therefrom through the same scanning chains and current pulse generators as used above. The output signals from the main memory take the same lines, traverse the same amplifiers and triggers as in the previous partial readings. These output signals are representative of the information contents in the card, and serve for performing calculations, or serve any other function.

An advantage of this device wherein a card is scanned successively by two sets of brushes is that it allows an easy check of the total number of perforations recorded in the card. The number of perforations sensed by the first set of brushes is counted in a counter, e.g., a binary counter, and the number's complement is transferred into a second counter which then counts the perforations subsequently scanned in the same card by the second set of brushes. An error is detected if the second counter is not reset at the end of reading. This allows a check of correct operation not only in brush sensing but also in recording and reading in the intermediate memories since checking is performed after this step.

Another advantage of this reading device is its ability to sense easily among 80 columns in a card, those where two or more perforations exist, and those where there is none. This sensing may occur either for the whole of the rows in the card, or for digital columns (perforations from 9 to 0), or any other field determined in advance.

Another object of this invention is to provide an improved comparing arrangement wherein a comparison can be made between arbitrarily selected fields in two successive cards, and in the case where perforations are different, an appropriate signal is developed to initiate a control break (e.g., major, intermediate, or minor control break).

This device compares by positions all the data punched in a card with all the data punched in the next card, that is, the comparison involves the 80 columns and the 12 rows. Through the combination of this comparison device with a field section device, comparison may be restricted to the data recorded in the selected field.

The width of a selected field is determined by two connections; the one determining the first column or start column and the other the last column or stop column.

The restricted number of connecting lines constitutes an important advantage and a substantial simplification in the wiring of the control panel.

Another advantage of this reading apparatus is that the use of the information read from the card is not performed directly from the brushes, but from the output pulses of triggers. These pulses therefore, are always of predetermined magnitude; they form the input information in the coder, the main memory, the check device, the verification device, the selector control device, etc. In conventional machines, if a perforation is not sensed correctly by the read brush, the read signal which is developed directly by the brush may be insufficient to control one or several devices (i.e., a selector cannot be energized), on the other hand, other devices sensitive to weaker signals may be operated (i.e., the device for the verification of the perforation detection).

According to the present invention, selectors may be energized electronically by the sensing in a card of a perforation at the crossing of a given row with a given column, through a process of simple coincidence in the time of a certain number of pulses which determine the existence of the perforation and serve the purpose of locating this row and this column. This process is more advantageous than that used in conventional accounting machines wherein a selector is energized solely by the current flowing through the read brushes, during the time that contact is made through the perforation between the brush and the cylinders. According to the invention, the brush sensing circuit is used to change the saturation state of a magnetic core which in its turn controls a trigger, and the latter operating the selector.

Selectors may serve for program change as in conventional accounting machines, for adding extra steps of program or serving any other function. The timing of the various operational cycles in the machine is such that the same selectors may be used indifferently in input circuits, output circuits or calculation circuits in the machine.

Accordingly, another object of this invention is to provide improved flexibility in the use of selectors.

Another object is to provide improved control for selectors.

Another object is to provide a reading device with improved reliability.

Another object is to provide improved flexibility in the use of a comparison device.

Another object is to provide an improved data checking arrangement.

Another object is to provide improved mechanism for entering data into storage.

Another object is to provide an improved system for transferring data appearing in a first code to a storage device using a second code.

Another object is to provide an improved system for transferring data between storage media requiring a minimum of equipment.

Another object is to provide an improved coder.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 2 shows an example of a perforated card and the coding normally used therein.

FIG. 3 shows the 7-position code used in the memory device of the present invention.

FIGS. 4a through 4f show a detailed block diagram of apparatus constructed in accordance with the present invention.

FIG. 8 shows an example of the use of a switch that determines the row of the card, and the scanning chain that locates the columns in order to control the selectors.

FIGS. 9 and 9a show symbolically and in detail an example of a logical AND circuit.

FIGS. 10 and 10a show symbolically and in detail an example of a logical OR circuit.

FIGS. 11 and 11a show symbolically and in detail an example of a diode gate.

FIGS. 12 and 12a show symbolically and in detail an example of a level setter.

FIGS. 13 and 13a show symbolically and in detail an example of a two-input amplifier.

FIG. 13b shows symbolically an example of a one-input amplifier constructed according to FIG. 13a.

FIGS. 14 and 14a show symbolically and in detail an example of a three-input trigger (one of these three inputs being a binary one).

FIG. 14b shows symbolically an example of a two-input trigger similar to that shown in FIG. 14a.

FIGS. 15 and 15a show symbolically and in detail an example of an inverter.

FIGS. 16 and 16a show symbolically and in detail an example of an emitter follower.

FIGS. 17 and 17a show symbolically and in detail an example of a selector and its hold.

FIG. 18 shows how FIGS. 4a through 4f should be placed together.

FIG. 19 shows how FIGS. 5a and 5b should be placed together.

*Timing Pulse Generation*

The pulses which feed the reading device may be developed in accordance with pulse-generating means well known in the art. Moreover, these pulses may vary with the characteristics of the reading device (card, memory, etc.). The example of pulse generation given in FIGS. 4c and 4f is described only by way of illustration and can be adapted to any reading device in conformity with the invention.

Figure 6:
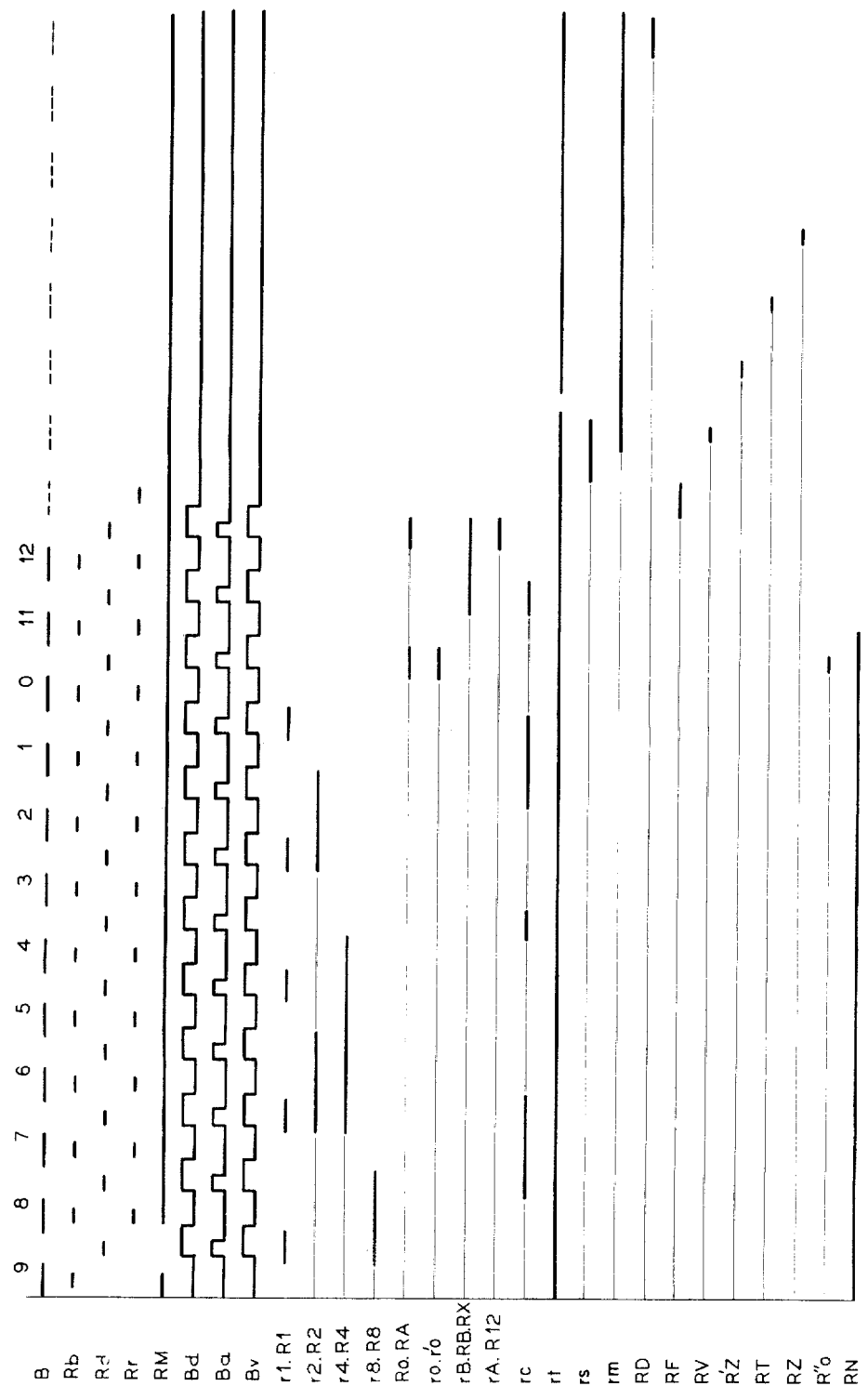
FIG. 6 shows the timing diagram of the cam contacts and the operational time diagram of some triggers and breakers.
Figure 7:
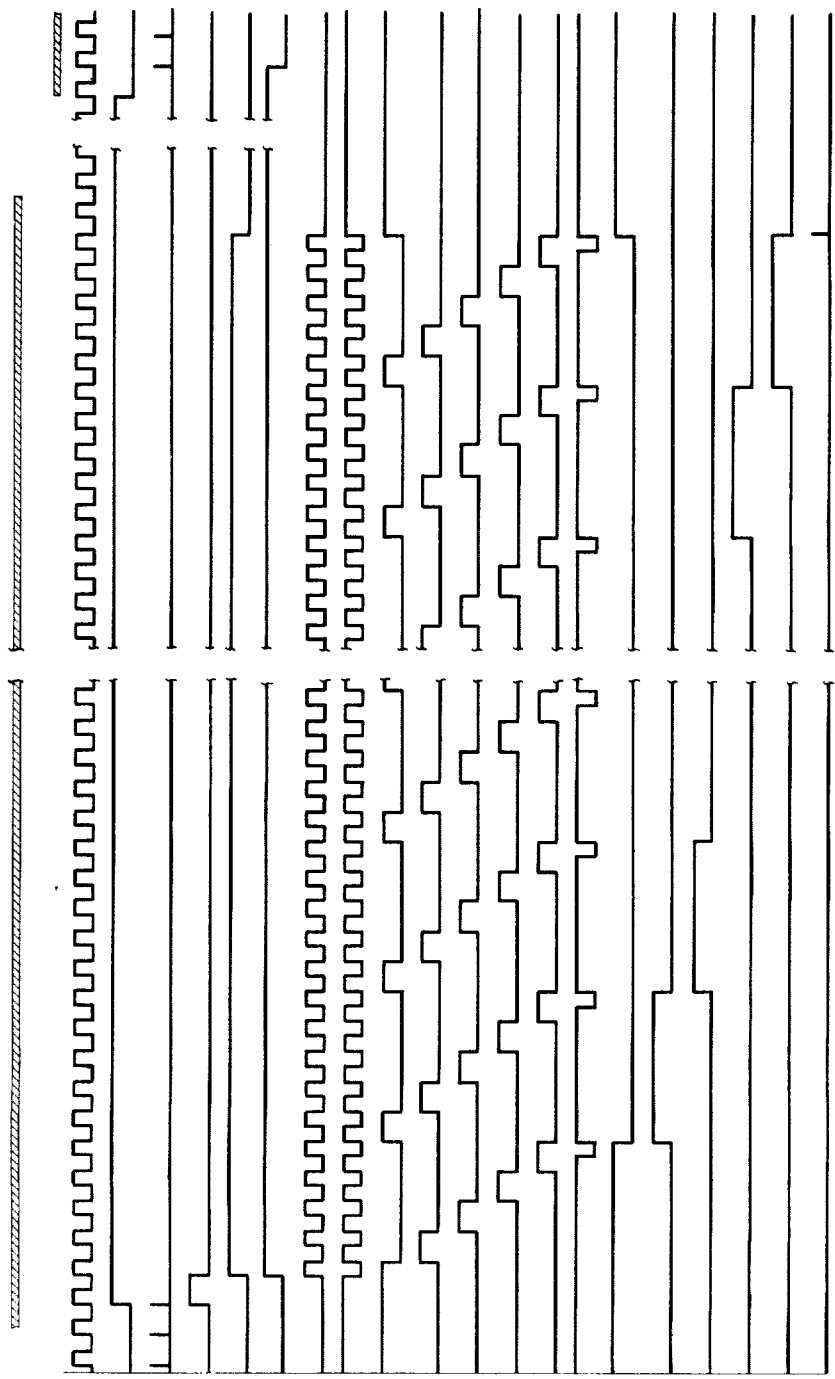
FIG. 7 shows some of the pulse trains occurring at various points during the operation of the scanning and timing chains.

The circuits which generate the timing pulses are shown in FIGS. 4c and 4f, and their time diagrams in FIGS. 6 and 7. The pulses are developed through a generator G, a start trigger $Bd$, and advance trigger $Ba$, a latch trigger $B'v$, two timing circuit chains, a start breaker $Rd$ and a reset breaker $Rr$, both being cam-controlled contacts. One of the two timing circuit chains comprises 80 stages of triggers $b1$ through $b80$ for generating 80 successive pulses of duration $t$. The other timing chain, comprises 5 stages of triggers for dividing each of the 80 preceding pulses into basic pulses; these 5 triggers being designated by the name of reset trigger $Bz$, read trigger $Bl$, check trigger $Bv$, delay trigger $Br$ and record trigger $Be$. The pulse of duration $t$ thus is divided into pulses of duration $tz$, $tl$, $tv$, $tr$, $te$, meant for resetting, reading, checking of code C, delaying and recording, respectively.

Each trigger may be constituted either of tubes or transistors, each having two stable states designated by the terms of "state of rest" or "OFF," and "state of operation" or "ON." In FIGS. 4a, 4b, 4c, 4e and 4f, the triggers are represented symbolically by rectangles with two lower input terminals, and two upper output terminals; a signal at the right input terminal drives the trigger to "ON" condition and the corresponding output signal develops at the upper right terminal. Likewise, left terminals correspond to "OFF" condition of the trigger. FIGS. 14, 14a and 14b show an example of trigger. In both chains, a single stage is "ON," all the other being "OFF." Under the action of advance pulses, the chains progress stage by stage, that is to say that the trigger being "ON" switches to "OFF" and the next trigger switches to "ON." The scanning chain progresses from the right to the left, that is, from $b80$ to $b1$, while the timing chain progresses from the left to the right, that is, from $Bz$ to $Be$. These chains for example, may be of the type described in applicants' copending application Serial No. 643,369, filed March 1, 1957, now Patent No. 2,947,865.

The readout of a card is performed in 12 sensing cycles corresponding to the 12 rows of the card. Curve B in FIG. 6 represents these cycles which start at the beginning of a bar and end at the beginning of the following bar. Each cycle comprises the time interval between the sensing of two successive rows of perforations. At the beginning of each sensing cycles, all the triggers are "OFF" except reset trigger $Bz$ and the first trigger of scanning chain $b80$. (Refer to curves $Bz$ and $b80$ in FIG. 7.) The initial state of the triggers is indicated in FIGS. 4a through 4f with a dot in the lower right corner of the rectangle which symbolizes the triggers in "OFF" condition and the left corner the triggers in "ON" condition.

Generator G for example, may be constituted of a multivibrator. It generates square pulses of frequency F and shown on curve G in FIG. 7.

The make time of start breaker $Rd$ is given by curves $Rd$ in FIGS. 6 and 7. Under the action of its cam, start breaker $Rd$ makes to apply a positive voltage to an input terminal of logical AND circuit $ed$. This circuit is a diode gate, an example of which has been shown symbolically and in detail in FIGS. 11 and 11a. This gate has two input terminals, a slow one designated by a diamond, and a fast one. The signal at the slow input is applied to a resistor and enables both to charge the capacitor. The derivative of the signal applied to the fast input traverses the capacitor. The simultaneity of the signals at both inputs develops a signal at the output, at a moment which coincides with the ascending edge of the fast pulse. A similar type of a diode gate is described in U.S. Patent No. 2,580,771. The slow input of $ed$ is connected to high voltage through breaker $Rd$, the fast input receives the signal from generator G. The simultaneity of the signals at both inputs starts an output signal at the moment which coincides with the ascending edge of the short signal. This output signal of $ed$ is applied to the right input terminal of start trigger $Bd$ which flips to "ON" (curve $Bd$ in FIG. 7). The output voltage at the right terminal of $Bd$ and that at the left terminal of trigger $B'v$ which is "OFF" is applied to the two input terminals of logical AND circuit $Ed$. The output voltage of this circuit $Ed$ lasts during the time when simultaneously $Bd$ is "ON" and $B'v$ "OFF" and is represented by curve $Ed$ in FIG. 7. The coincidence between this pulse $Ed$ and the ascending edge of the pulse from generator G is determined through gate $E'd$. The signal at the output of $E'd$ is applied to the right input terminals of advance triggers $Ba$ and latch trigger $B'v$ which flip to "ON" at a time which coincides with the trailing edge of curve $Ed$. (Refer to curves $Ba$ and $B'v$ in FIG. 7.)

Simultaneously with the switching to "ON" of trigger $Bd$ pulses represented by curve $E'v$ in FIG. 7, which were used to switch $B'v$ to "OFF," cease. As a matter of fact, these pulses could only exist inasmuch as trigger $Bd$ was "OFF" since they were generated at the output of gate $E'v$ by the ascending edges of the pulses emitted by G which are simultaneous with the signal at the left output of $Bd$.

In conclusion, triggers $Ba$ and $B'v$ switch to "ON." $Ba$ serves the purpose of advancing the timing and scanning chains, and its functions will be studied later on.

B′v is used to set up a single operation of the timing chain and to avoid a second sensing operation as long as breaker Rd is closed.

As long as trigger Ba is "ON," pulses generated by G appear at the output of logical AND circuit Ea; these pulses represented by curve Ea in FIG. 7 are applied first to a circut Na so that the pulse at the output of Na may reach the required level, then to an inverter Ia. Pulses at the output of Ia enable the timing chain to progress. They are represented by curve Ia in FIG. 7. For a better understanding of the operation of the chains, it should be useful to refer to aforesaid patent application.

At the beginning of the sensing cycle, in the timing chain trigger Bz was "ON," as also trigger b80 of the scanning chain. (Refer to curves Bz and b80 in FIG. 7.) The voltage collected at the output of Bz is applied to the left input of triggers B1, B2, B4, B8, BA, BB, BC, Bm, B′m and BI to reset them to "OFF." (Refer to FIGS. 4c and 4e.)

At the output of advance inverter trigger Ia, the advance pulse is shown by curve Ia in FIG. 7. First pulse Ia, the ascending edge of which coincides with the operational state of Bz traverses diode gate Ez, switches to "ON" trigger BL and resets to "OFF" trigger Bz. The timing chain progresses by one stage. The pulse at the output of read trigger Bl represented by curve BL in FIG. 7 is applied to a circuit NL enabling the pulse to reach the required level, then to logical AND circuits Em, E′m, E1, E2, E4, E8, EA, EB, EC, 1L, 2L, 3L to 79L and 80L. It serves the purpose of determining a reading time tl in the memories.

The ascending edge of advance pulse Ia which coincides with the "ON" condition of BL traverses gate EL, drives Bv to "ON" and resets BL to "OFF." The timing chain progresses by one stage. The pulse at the output of trigger Bv represented by curve Bv in FIG. 7, constitutes a time tv of the verification of code C. For this purpose, it is applied to an input of logical AND circuit E′e in the evenness check device. (Refer to paragraph headed "variant of the coder" and FIG. 5b.)

The ascending edge of advance pulse Ia which coincides with the operational state of Bv traverses gate Ev, drives Br to "ON" and resets Bv to "OFF." The timing chain progresses by one stage. The pulse at the output of Br, represented by curve Br in FIG. 7, constitutes a time tr of delay between the verification time and the recording time. It is applied to trigger BI through gate EI.

The ascending edge of advance pulse Ia which coincides with the operational state of Br traverses gate Er, drives Be to "ON" condition, and resets Br to "OFF." The timing chain progresses by one stage. The pulse at the output of Be, represented by curve Be in FIG. 7, is applied to a circuit Ne enabling the pulse to reach the required level, then to logical AND circuits E′1, E′2, E′4, E′8, E′A, E′B, E′C, 1e, 2e, 3e to 79e and 80e. This pulse serves the purpose of determining time te meant for recording operation in the memories.

The ascending edge of advance pulse Ia which coincides with the operational state of Be traverses gate Ee. At the output of Ee, it drives Bz to "ON" and resets Be to "OFF." The timing chain starts a new progression from Bz. The pulse from generator G which coincides with the "ON" condition of Be traverses logical AND circuit E′a. At the output of E′a, the pulse is applied to a circuit N′a which enables it to reach the required level, to an inverter I′a, then to diode gates e1, e2 to e79 and e80. This pulse at the output of I′a is represented by curve I′a in FIG. 7; it is meant for the progression of the scanning chain. As a matter of fact, the ascending edge of pulse I′a traverses gate e80 because trigger b80 is "ON," it drives trigger b79 to "ON" and resets b80 to "OFF." (Refer to curves b80 and b79 in FIG. 7.) The scanning chain therefore progresses by one stage to the left every time the timing chain is completely traversed. While trigger b79 is in "ON" condition, the timing chain again conditions the second timing chain to provide the basic pulses of duration tz, tl, tv, tr, te, as previously described for resetting, reading, verifying, delaying and recording in column 79. When the timing chain again has been entirely traversed, its last pulse drives trigger b78 to "ON" condition and resets b79 to "OFF." And so on, the scanning chain progresses by one stage every time the timing chain has been traversed completely. Assume that t designates the time interval between two advance pulses of the scanning chain, that is, the time during which each trigger b80, b79 to b1 is in "ON" condition. To each one of the 80 triggers as to each time t correspond one column of the card and memories. These times are divided into basic times, successively tz, tl, tv, tr, te, respectively meant for resetting to "OFF" triggers B1, B2, B4, B8, BA, BB, BC, Bm, B′m, and BI for the reading of the data entered in the corresponding column of memories m, m′ and M, for the verification of code C in this column for determining a certain delay and for recording operation in this column. Assuming that the scanning chain has been completely traversed, it is the turn of trigger b2 to switch to "OFF" and trigger b1 to switch to "ON." (Refer to curves b2 and b1 in FIG. 7.) Operation time t of b1 is also divided into tz, tl, tv, tr, te assigned to column 1. When both chains have been completely traversed; Be and b1 are "ON." The output voltage of Be traverses logical AND circuit Ef, it is applied as also advance pulse Ia to the two inputs of gate E′f. The ascending edge of Ia which coincides with the operational state of b1 and Be traverses E′f. The pulse at the output of E′f (curve E′f in FIG. 7) is applied to the left input of advance trigger Ba so that Ba will be reset to "OFF" at a time which coincides with the trailing edge of b1. (Refer to curve Ba in FIG. 7.) Moreover, advance pulse Ia and pulse generated by G, respectively, traverse circuits Ee and E′a; the signal at the output of Ee resets Be to "OFF" and drives Bz to "ON." The signal at the output of E′a is applied to circuit N′a to inverter I′a, then to diode gate e1 it traverses since b1 is "ON" (curve I′a in FIG. 7) it resets trigger b1 to "OFF" and drives trigger b80 to "ON."

Ba being "OFF" both chains come to a stop with all their triggers in "OFF" condition except Bz and b80 which are "ON."

When reset breaker Rr closes its contact (curve Rr in FIGS. 6 and 7), it applies a positive voltage to the slow input of gate er. The first ascending edge of the pulse from generator G which coincides with the make of contact Rr develops a signal at the output of circuit er, this signal is applied to the left input terminal of Bd which slips to "OFF." (Refer to curve Bd in FIG. 7.) The voltage at the left output of Bd is applied to diode gate E′v, enabling the ascending edges of the pulses developed by G to show up at the output of E′v; these pulses are represented by curve E′v in FIG. 7. They drive trigger B′v to "OFF" condition. (Refer to curve B′v in FIG. 7.) Triggers Bd, Bv and Ba are back again to "OFF" condition, the timing and scanning chains have been completely scanned, the scanning cycle of the next row is ready to start.

*General Description of the Read Device*

Figure 1:
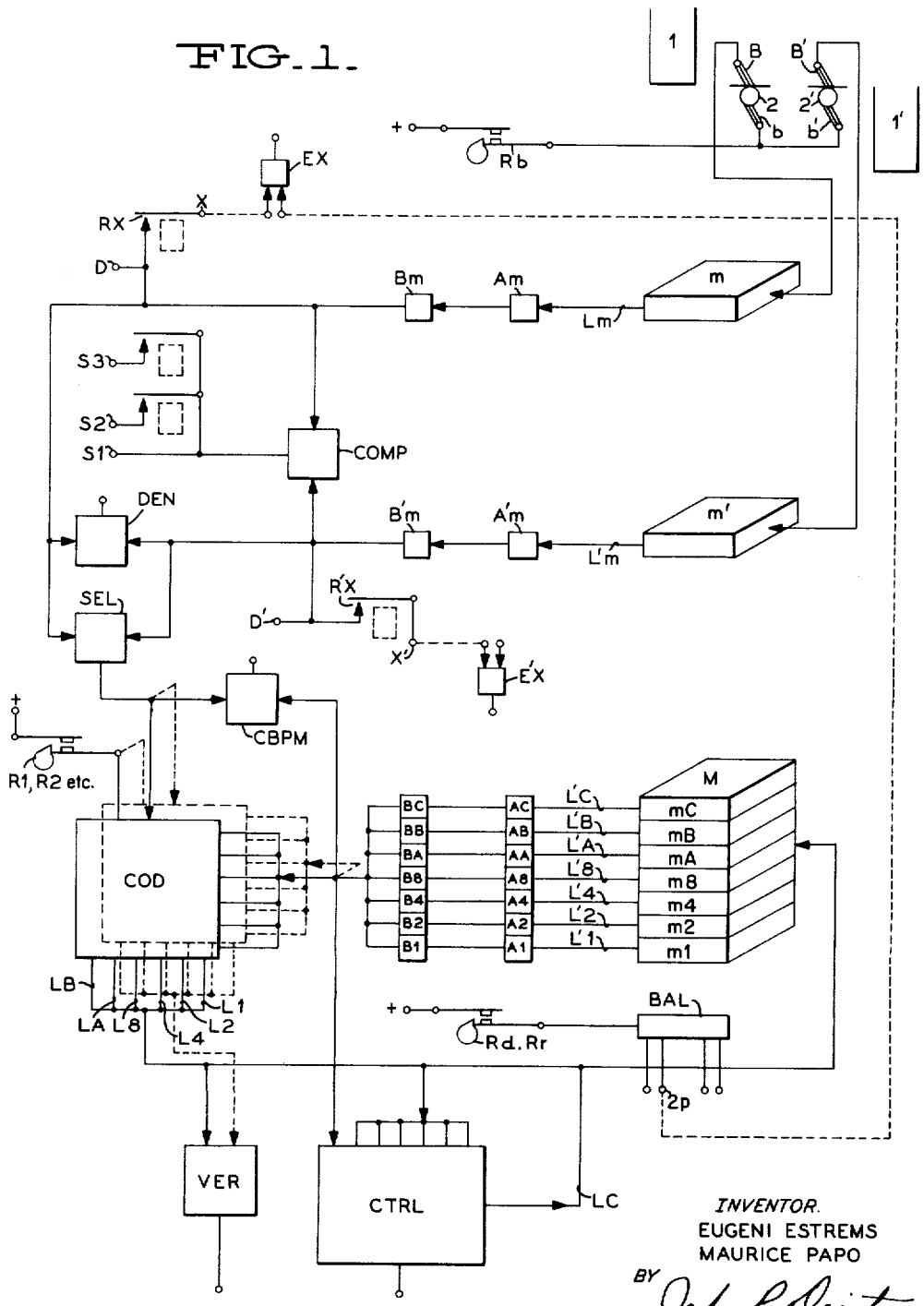
FIG. 1 shows in the form of an operational diagram apparatus constructed in accordance with the present invention.

Referring to FIG. 1, a hopper 1 contains the cards to be read. These cards, for example, may be 80 column and 12-row cards, as that shown in FIG. 2, 10 rows representing digits from 0 to 9 and two rows being designated 11 and 12. It is quite obvious that the invention also may concern any other card or tape or device used for recording any information according to any method—magnetization, punching, or mark sensing, etc. Drive rollers direct the cards first between a set B of 80 read brushes 1B, 2B to 80B and contact cylinder 2. On cylinder 2 slides a common brush b which is connected through a cam-controlled breaker R$b$ to a positive voltage source. The make time of breaker R$b$ is represented by curve R$b$ in FIG. 6. The 80 brushes are disposed in a line so as to simultaneously sense all perforations a row at a time. They scan simultaneously the perforations liable to be punched in a row of the card by setting an electric contact with drive cylinder 2. The readout of a card is performed in 12 successive cycles, the card moving continuously.

The reading device is provided with a second set B' of 80 brushes 1'B, 2'B, 3'B, to 79'B and 80'B which make contact with a cylinder 2' which is supplied with high voltage by common brush b'. After the drive rollers have driven the card past the two sets of brushes, the cards are directed into a stacker 1' where they are collected.

The reading device of FIG. 1 is provided with main memory M and two intermediate memories $m$ and $m'$. All these memories may be of any type. In this description, it is assumed that they are constituted by magnetic toroid cores which can have two stable magnetic states respectively characterized by a negative or positive remanent induction to represent information in the binary numeration system, with zero being arbitrarily chosen to represent one magnetic saturation state and the value 1 to represent the other stable state. The development of a magnetic field +2H causes the core to switch from state 0 to state 1 so as to record an information therein, the development of a magnetic field −2H resets it to state 0 generating a read pulse whereas a field ±H does not change the state of the core.

Memories $m$, $m'$, M, respectively, are constituted of magnetic cores which may be arranged in any manner. For economical reasons the first two memories are arranged in two-dimensional arrays, each 8 x 10, and the third memory is arranged as a stack of seven of said two-dimensional arrays. The seven arrays are designated $m$1, $m$2, $m$4, $m$8, $m$A, $m$B, $m$C. In FIG. 4$f$ in order to simplify the description and make understanding easier, it is assumed that the arrays of 80 magnetic cores are arranged in a row. Therefore, memories $m$ and $m'$ are represented each by a row of 80 ferrite cores designated 1$m$, 2$m$, 3$m$ to 80$m$ and 1'$m$, 2'$m$ to 80'$m$ and memory M is represented by 7 rows (1, 2, 4, 8, A, B, C) of 80 ferrite cores designated 11, 21, 31 to 791, 801–12, 22, 32 to 792, 802–1A, 2A, 3A to 79A, 80A–1C, 2C, 3C to 79C, 80C, the digit indicating the column, and the index row. In FIG. 4$f$, memories M, $m$, $m'$ have been represented only by columns 1, 2, 3, 79 and 80 so as to avoid useless repetition, columns 4 through 78 being similar to the others.

Cores in memory M are traversed by 4 windings, two for recording and two for reading; those of memory $m$ are traversed by 3 windings, one for recording and the other two for reading. A winding may be constituted by any number of turns, but, in order not to complicate FIG. 4$f$, it is represented as a single slanted line.

In the memory M, the 80 windings, associated with the 80 cores arranged in the same row, are serially connected. They receive through lines 1 the record signals from the coder and develop a record field H in the row (or rows) determined by the coder. Moreover, the seven windings pertaining to the seven cores of M arranged in the same column are serially connected. They receive during time $te$ meant for the recording, the pulses from the scanning chain and generate successively in each selected column of seven serially connected windings. During a recording operation, a memory M core, at the intersection of a selected row and column, will receive coincident recording currents of magnitude 2H which is sufficient to switch the core from a zero state to a one state.

In memories $m$ and $m'$, both record windings are replaced by a single one which may directly be connected to the corresponding read brush in order to develop a magnetic field 2H when a perforation has been sensed.

On a memory readout operation, the 9 windings pertaining to the 9 cores of a given column (say the 7 of M and those of $m$ and $m'$) are serially connected. They receive during time $tL$ a readout current of magnitude −2H which will reset to zero state all cores which were in state 1, thus generating read pulses in read line (or lines) L which traverse the 80 cores.

The 1, 2 or 3 dimensional ferrite arrays obviously disclose that it is possible to arrange the ferrites according to any other mode. In the case where the memory is constituted of a 3-dimensional array, the magnetization of the ferrites may be effected in the manner described in U.S. Patents No. 2,740,949 and No. 2,739,300. According to these patents, several windings around the magnetic cores develop magnetic fields +H or inhibition fields −H insufficient to cause the core to change its saturation state, but the presence of two magnetic fields +H in the absence of an inhibition field −H provides a resultant field +2H sufficient to change the saturation state of the core.

During the first read cycle of 12 successive read cycles for each card, the 9's row of the card is scanned by the 80 brushes B, one brush being provided for each one of the 80 columns of the card. The information is read out in parallel and entered in parallel into the memory $m$. At the end of this cycle, an image of the data in the 9's row of the card will have been transferred into memory $m$.

Just prior to reading the next row of the card the information stored in the memory $m$ is serially transferred therefrom and entered, in translated form, into main memory M and at the end of this operation the cores in intermediate memory $m$ are restored, each to its zero state.

After the scanning of the 9 row in the card (curve B in FIG. 6), start trigger R$d$ (curve R$d$ in FIG. 6) initiates operation of the 80 stage scanning chain, the stages of which are driven to "ON" condition successively in sequence (curves $b$1, $b$2 to $b$80 in FIG. 7). The 80 outputs of triggers $b$1, $b$2 to $b$80 of this chain are connected each to a different one input of the 80 logical AND circuits 1L, 2L, 3L to 79L and 80L. The output pulses of trigger BL are applied to the other input of these AND circuits. Thus, successively at each AND circuit there will be a coincidence between the two input pulses, and at the output of each one of the 80 AND circuits, pulses will develop successively which control current pulses generators 1$g$, 2$g$ to 80 $g$. These current pulse generators, as also generators 1'$g$, 2'$g$ to 80'$g$, G1, G2, G4, G8, GA, GB, GC further mentioned in the description are designated in FIG. 4$f$ by a rectangle provided with one input and one output. A signal at the input of one of these generators causes a current pulse, at the output thereof, which traverses the windings of the ferrite cores. These generators may be constituted as that described in Serial No. 646,892, now Patent No. 3,021,484. Generators 1$g$, 2$g$ to 80$g$ successively develop currents which flow through the 9 read windings (of $m$, $m'$, M) of the 80 columns generating currents of −2H. If a magnetic core of memory $m$ is in saturation state 0, the reading current which traverses this winding will not change its state. If the core is in saturation state 1, it comes back to saturation state 0 and generates a pulse in line L$m$ which traverses the 80 cores of $m$. The presence of one perforation in a given column therefore finds expression during the operation of read trigger BL and during the operation of the scanning trigger corresponding to this column by the existence of a pulse on read line L$m$, whereas the absence of a perforation is expressed by a lack of pulses. These pulses read out of memory $m$ are applied through line L$m$ to the input of a read amplifier A$m$. They traverse logical AND circuit E$m$ conditioned by the output pulse of trigger BL and are applied to the input of trigger B$m$ which stores these pulses. The output of this trigger is applied through the device for the selection of the brush set, to the coder, then to memory M.

Assume that the scanned card presents a perforation in row 9 and column 79, for example. After the scanning of the card, core 79m is in saturation state 1. The time during which trigger b79 is driven to "ON" comprises: a time tz which resets the triggers to "OFF," a read time tL during which generator 79g generates a current pulse 24 which traverses the read winding of core 79m. The core resets to zero state and provides a read signal which is applied through amplifier Am line Lm, AND circuit Em, trigger Bm, the device for the selection of the brush set, to an input of logical AND circuit EL. Verification time tv of code C succeeds read time tL and relay time tr succeeds verification time tv. The leading edge of the delay pulse, emitted by delay trigger Br, traverses gate EI and drives to "ON" trigger BI. The leading edge of the reset pulse from Bz traverses E'I and resets BI to "OFF." Thus, BI is "OFF" during times tz, tL, tv, and "ON" during times tr and te. The right output of BI is connected to the second input of logical AND circuit EL. When BI is "OFF," it breaks the path of the read signal; on the other hand, when it is "ON," it favours EL. The read signal then develops at the output of EL during times tr and te. The read signal then is applied through line L to the input of the coder. The coder lines 18 and 11 condition logical AND circuits E'8 and E'1 because the coder translates 9's into expression values 8 and 1. (Refer to paragraph "Code and coder" and time diagram of the coder breakers.) Following the operation of trigger b79, and during the operational time of trigger Be, generators G8 and G1 develop a current H in the record windings of the 80 cores of rows 8 and 1 in memory M. Simultaneously, a similar current H is developed in the 7 record windings of column 79 by means of pulse generator 79'g. The coincidence of these two currents at the input of logical AND circuit 79e, the one from trigger b79 in the scanning chain and the other one from record trigger Be cores at the crossing of lines 8 and 1 with column 79. Following the sensing of the 9's row in the card, the 8 row of perforations will be sensed in the manner described.

Trigger Bm resets when b80 switches to "ON," the cores of intermediate memory m are serially reset to saturation state 0 during read time tL of the corresponding column. Finally, the last core of m, that corresponding to column 1, is reset while trigger b1 is "ON." Thus, the cores of m and all the triggers are reset in preparation for the sensing of the 8 row of perforations in the card. Scanning chain b1, b2 to b80 operates during time tz to develop a pulse for resetting triggers B1, B2, B4, B8, BA, BB, BC, Bm, B'm and BI, then a readout pulse for the readout of the 9 cores of the memories M, m, m' of one column, a pulse for the verification of code C and finally a recording pulse for recording into memory M. For cores which are in saturation state 1, the readout pulse generates a signal in corresponding read lines L'1, L'2, L'4, L'8, L'A, L'B, L'C, Lm or L'm. This signal traverses respectively read amplifiers A1, A2, A4, A8, AA, AB, AC, Am or A'm, logical OR circuit CO, AND circuits E1, E2, E4, E8, EA, EB, EC, Em or E'm, and triggers B1, B2, B4, B8, BA, BB, BC, Bm or B'm in order to energize the coder. For each column, the coder receives electronic signals representing: data read out from the memory m, the main memory M, and the information indicating the row being scanned, in this case, the row of the 8's. The coder combines this information to cause a change in the state of the ferrites at the crossing of the row of the 8's with the columns where perforations have been sensed and at the crossing of rows 8 and 1 with columns representing perforations sensed during the preceding cycle. The readout of memory m coincides with that of the memory M so that on each cycle the information data previously entered in memory M are re-read out and fed through the coder wherein it is combined with currently sensed card row information and this combined information is fed back into the memory M. This operation is repeated for each succeeding row of the card cycle so that, at the end of the card cycle, the 12 rows of card data will be in the main memory in a code form, different from the original card code form.

The code conversion, the verification of the coder, the counting of the perforations sensed in a card, the comparison of the information punched in two subsequent cards, the evenness check, the sensing of blank columns and multiple perforations, etc., are performed by unique devices which will be studied in subsequent chapters. To all these devices are applied the output signals of triggers Bm and B'm.

The reading device further includes a second set of read brushes B', a second intermediate memory m', and a read line L'm connected to trigger B'm. Both sets of brushes B and B' are separated by an interval that enables corresponding rows of successively fed cards to be simultaneously scanned. The scanning chain is common to memories m and m', and at the output of triggers Bm and B'm, pulses are developed simultaneously which correspond to identical positions in rows and columns of two successively fed cards. Memory m' serves the same function as m, that of a parallel-series transformer, data introduced in parallel into m' may be entered in series in main memory M. A device for the selection of the brush set determines if the data to be recorded in M are those sensed by the first or the second set of brushes. (Refer to paragraph headed "selection of the brush set.") The provision of two sets of brushes B and B', of intermediate memories m and m' and of read lines Lm and L'm, provides for the comparison and verification of information contained in consecutive fed cards. It is quite obvious that this comparison and this verification may be performed by means of the logical circuits in the aforesaid U.S. Patent No. 2,718,356.

FIG. 1 shows the data flow from the card to the main memory, the coder is designated COD, scanning chains BAL, the evenness check device CTRL, the perforation counting device DEN, the device for the selection of brush sets SEL, the comparison device COMP, the blank column and multiple perforation sensing device CBPM and that for verification of the code conversion VER. The second coder shown in dotted lines is used to verify the first.

*Code and Coder*

The invention should not be limited to the codes described since codes of other types may be employed. Data to be read may be introduced into the apparatus through conventional punched cards such as those represented by way of example in FIG. 2. The card comprises 80 columns and 12 rows and according to the location of the perforations punched therein, it is possible to enter 80 characters. The 10 lower rows are assigned to digits from 9 to 0, and the 3 upper rows, 0, 11 and 12 serve the purpose of defining the letters, the special characters, the algebraic signs, etc., in combination with the digits 9–0.

For alphabetical representation, a code is used which comprises for each letter two perforations in the same column, one of these perforations being a digit from 1 to 9 and the other being chosen among 0, 11 and 12.

It is quite obvious that the code (FIG. 2) is given by way of example and any other system of codification may be used to represent signs + = ? " or else "Francs," "Pound Sterling," etc.

Figures 2, 3:
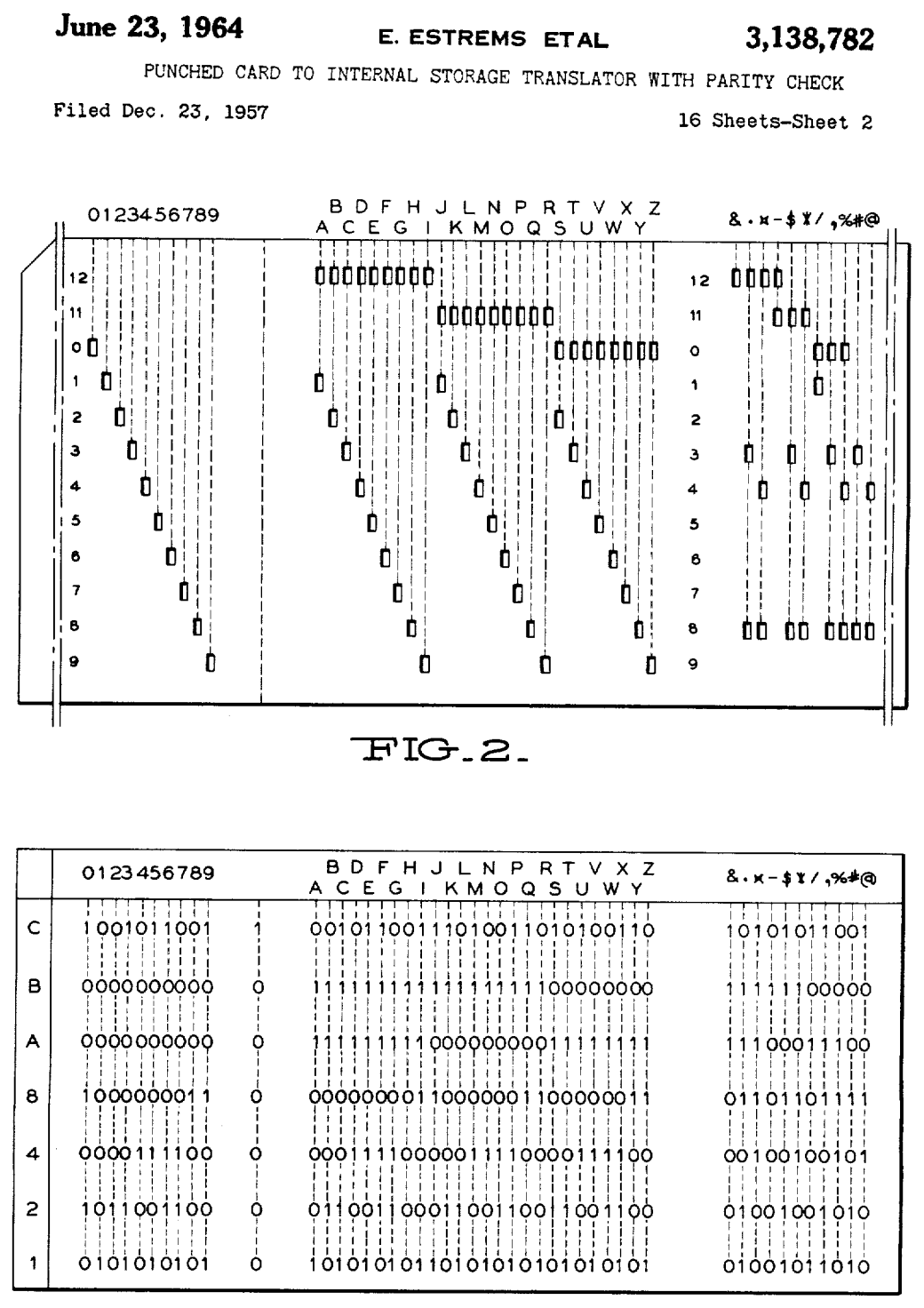

The code used in the memory is the 7-signal code 1, 2, 4, 8, A, B, and C. FIG. 3 shows how digits, letters and special characters are coded. In this figure, 0 and 1 designate the saturation states of a magnetic core respectively representing the absence or presence of a data signal. The first four signals 1, 2, 4 and 8 serve the purpose of representing digits in the binary numeration system. Codes A, B and group $A + B$ in combinations with digital signals serve the purpose of defining non-digital characters—letters and special characters.

Signal C is used as a parity check signal for the code. For each character, letter or digit, if the total number of signals which represent it are even, code C must be added thereto in order to make the parity count odd. If the total number of character signals is odd, code C is not added. In this manner all the characters are represented by an odd number of signals including the spacing designated "blank" which, as seen in FIG. 3, is represented solely by code C. This 7-signal provides, at any operation step of the machine, the disclosure of an error when the number of signals representing any character is not even.

If it is desirable to employ an even parity system, code C may be chosen so that the total number of signals is even.

The translation of the card data into this 7-signal code is performed in the coder. A digital perforation representative of decimal numeration is translated into its binary equivalent, for example, 7 is translated into $1+2+4$. A perforation in row 11 is translated by code B in row 12 into combination $A+B$. A combination of perforations is translated into the combination of the translation of each perforation, as this can be found out through the comparison of FIGS. 2 and 3. For instance letter G represented in the card by perforations 7 and 12 is translated into combination $1+2+4+A+B$. The perforation 0 is translated into $2+8$ or into A according to whether the perforation is alone or combined with one or several other perforations.

Figure 4A:
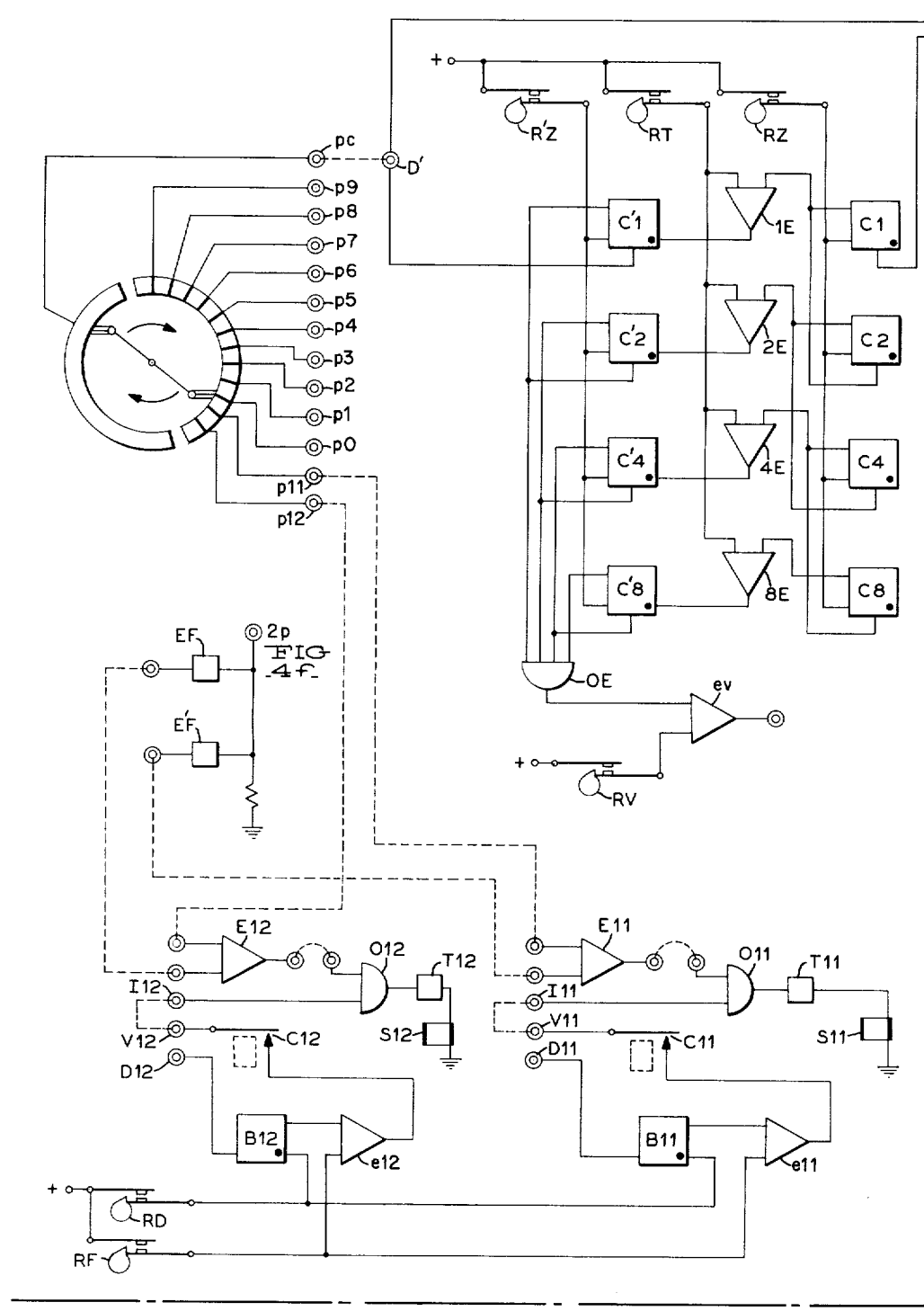
Figure 4B:
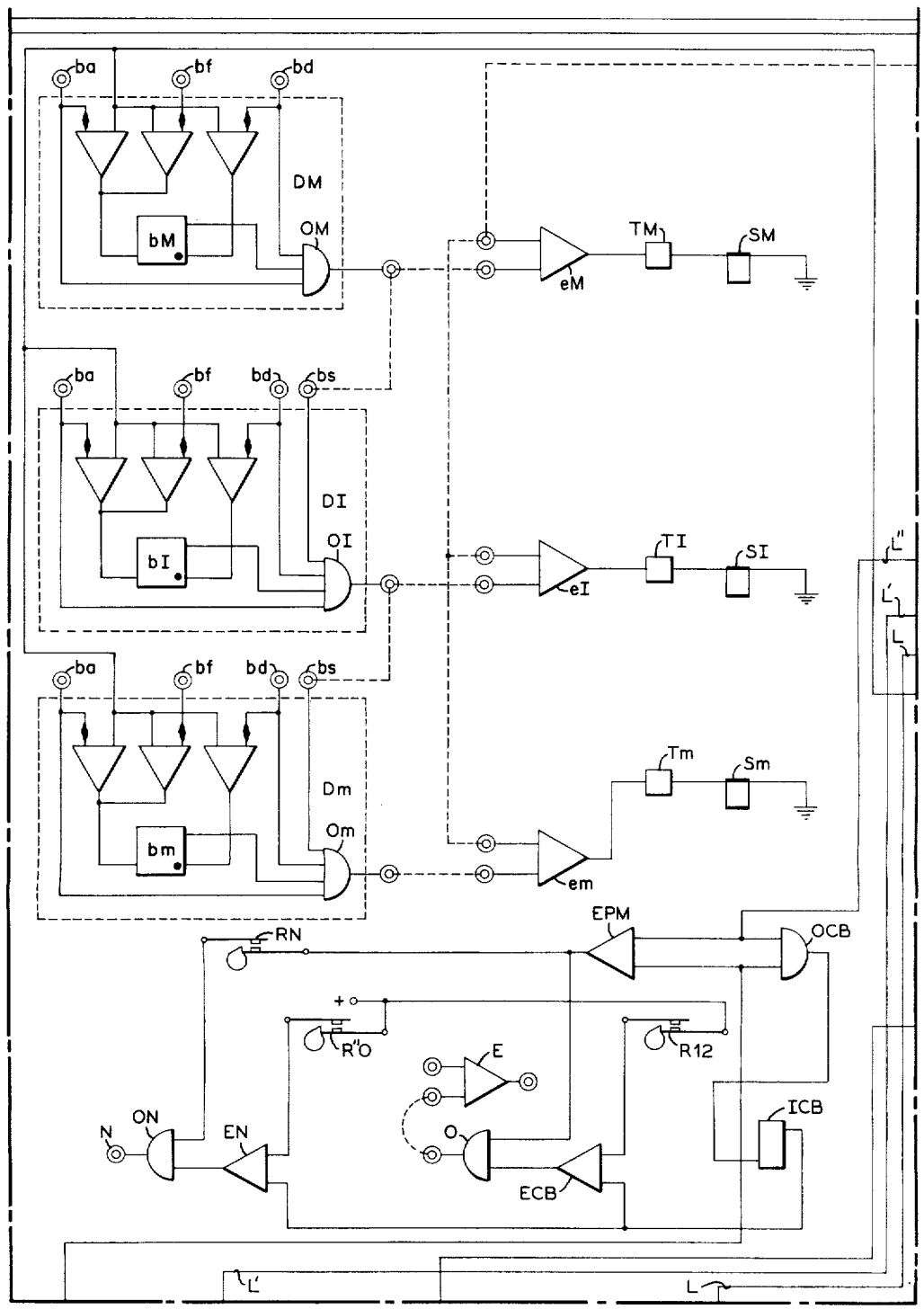
Figure 4E:
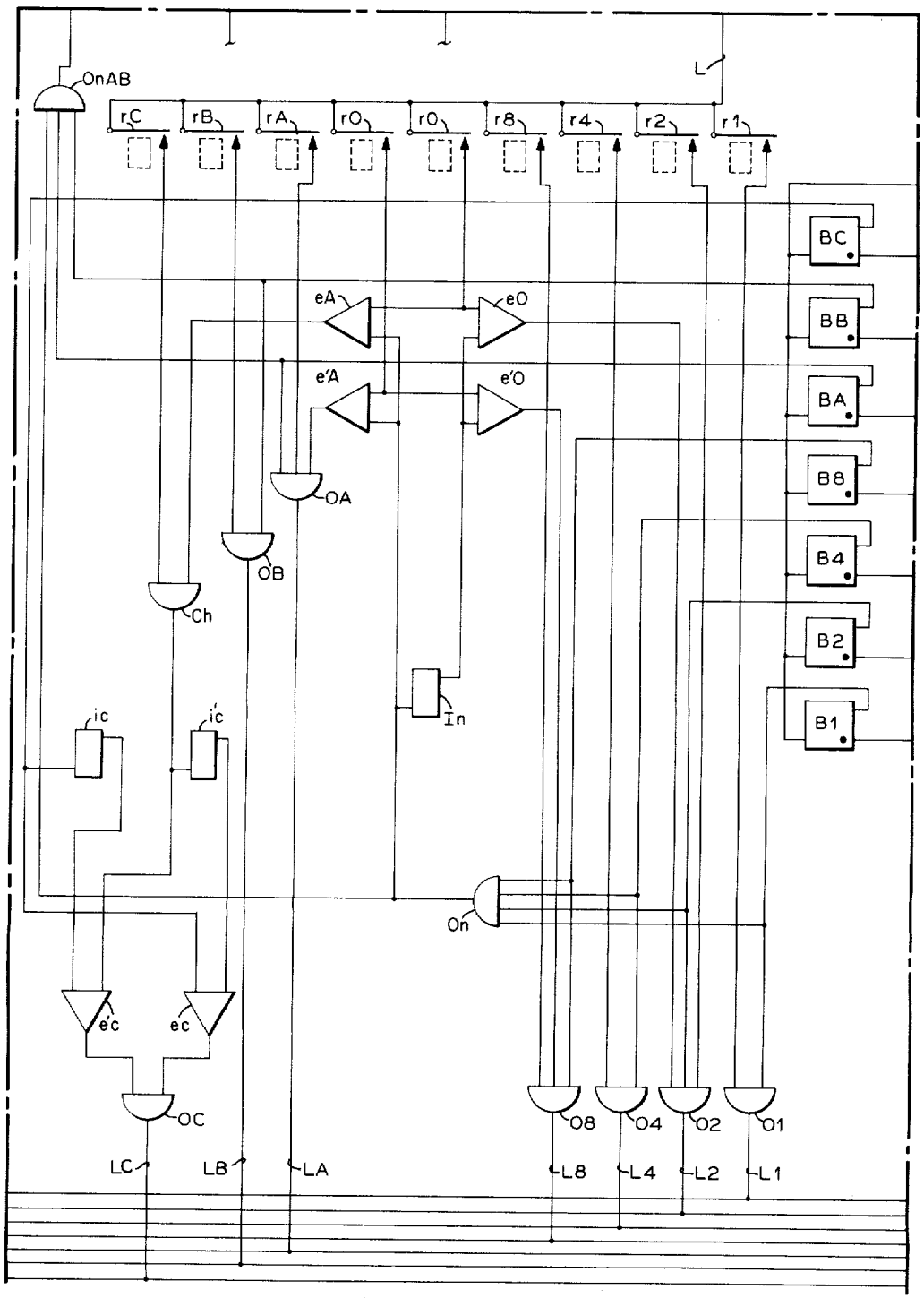

The output of the device for brush set selection is connected through line L to the input of the coder (FIG. 4e). Through this line are passed signals from one or the other of the triggers B$m$ and B'$m$ representing data readout of intermediate memory $m$ or $m'$.

Moreover, the coder receives a mechanical information indicating the row being scanned. This information, introduced in synchronism with the movement of the card, is under control of circuit breakers r1, r2, r4, r8, r0, r'0, rA, rB and rC.

The coder also receives through triggers B1, B2, B4, B8, BA, BB, BC, electronic signals from the readout of memory M and indicating the perforations sensed in the rows previously scanned in the card.

Breakers r1, r2, r4, r8, r0, r'0, rA, rB, rC are in normally open contact position and are operated by relay coils controlled by cams. Curves r1, r2, r4, r8, r0, r'0, rA, rB, rC, in FIG. 6, indicate as a function of the scanned row, the closed breaker contacts. The following table corresponds to the breaker time diagram:

| During the scanning of the following rows | All the contacts are open except the following ones closed |
| --- | --- |
| 9 | r1 and r8. |
| 8 | r8–rc. |
| 7 | r1–r2, r4, rc. |
| 6 | r2–r4. |
| 5 | r1–r4. |
| 4 | r4–rc. |
| 3 | r1–r2. |
| 2 | r2–rc. |
| 1 | r1–rc. |
| 0 | r0–r'0. |
| 11 | rB–rc. |
| 12 | rA–rB. |

In addition to these breakers, the coder includes 9 logical OR circuits O1, O2, O4, O8, OA, OB, OC, O$n$, and C$h$, six logical AND circuits e0, e'0, eA, e'A, ec, e'c, and three inverters I$n$, ic and i'c.

The signals from the readout of intermediate memory $m$ (or $m'$) are applied through line L to the upper contact of all breakers r1, r2, r4, r8, r0, r'0, rA, rB and rC. Lower contacts of r1, r2, r4, r8, rA and rB are connected to corresponding logical OR circuits O1, O2, O4, O8, OA and OB. The lower contact of rC is connected to OR circuit C$h$, that of r0 is connected to one input of the two AND circuits e0 and eA, that of r'0 is connected to e'0 and e'A. These contacts receive a signal if a perforation is sensed in the row of the 0's of the card. This signal is translated into code $8+2$ or A according to whether the perforation is alone or in combination with another perforation scanned during a preceding cycle. Coded digital signals from the readout at the output of the memory M are applied to the right output of triggers B1, B2, B4, B8, corresponding to logical "OR" circuit O$n$. The absence of a signal at the output of circuit O$n$ indicates the absence of digital perforations sensed during the preceding read cycles and corresponds to the existence of a signal at the output of inverter I$n$. In this case, 0 is translated into $2+8$. The output of I$n$ is connected to an input of two AND circuits e0 and e'0; the second input of e0 and e'0 being connected to the lower contact of breakers r0 and r'0 receives a signal only if a perforation is sensed during the scanning of the row of the 0's. Coincidence of the two signals at the inputs of the two AND circuits means the existence of a digital 0, which is coded as $2+8$. For this purpose, the output of e0 is connected to an input of OR circuit O2, and the output of e'0 to an input of OR circuit O8. Likewise, the existence of a signal at the output of OR circuit O$n$ indicates the existence of at least one digital perforation sensed during the preceding read cycles and in this case 0 is translated into A and the output signal of this OR circuit O$n$ is applied to one input of logical AND circuits eA and e'A, the second input of the latter being connected to the lower contact of r0 and r'0. Coincidence of both signals at the inputs of the two logical AND circuits means the existence of a non-digital 0, which is coded A and the output of circuit e'A is connected to an input of logical OR circuit OA. The output of circuit eA is connected to OR circuit C$h$ which controls the selection of code C in a manner to be explained.

Since the character bit pattern is constructed in a serial manner by repeatedly combining previously stored character bits in the memory M with currently sensed bits, the parity count changes; that is, from even to odd count or from odd count to even. When an odd parity count initially arises at the outset of a sensing operation, a C bit is introduced to provide for an even parity count. Subsequently, as succeeding card rows are scanned and other perforations are encountered, corresponding bits will be generated and combined with (added to) the already existing stored bits of a character. As such, the parity count changes. In order to make the final parity count even, it may be necessary to delete the parity bit C previously introduced. Thus, where a parity bit C was initially introduced and the parity count was unaltered during the succeeding sensing of character rows, the parity bit C remains in the final character. Where character perforations are sensed which do not initially require a parity bit C, the parity bit C is later added when subsequent perforations are sensed that would render the total parity count odd. Where the parity bit C was initially introduced and the parity bit count is again introduced on the sensing of perforations in the succeeding rows, the partity bit C must be deleted from the final count in order to render the final count even.

The information corresponding to the perforations scanned during the preceding cycles and entered in memory M is regenerated on each succeeding cycle. and combined with the information read out of the memories $m$ and $m'$. Read signals of memory M are applied through lines L'1, L'2, L'4, L'8, L'A, L'B, to amplifiers A1, A2, A4, A8, AA, AB, to logical AND circuits E1, E2, E4, E8, EA, EB (favoured by trigger BL during read time) to triggers B1, B2, B4, B8, BA, BB, then in the coder to one input of the corresponding OR circuits O1, O2, O4, O8, OA, OB.

Lines 11, 12, 14, 18, 1A, 1B, 1C, connect the output of the coder (output of OR circuits O1, O2, O4, O8, OA, OB, OC) to record circuits in memory M.

*Even Parity Check*

(FIG. 7)

The EVEN PARITY check circuits, shown in FIG. 4e, are arranged to process character bit configurations of the code 1-2-4-8-A-B-C by three groups arranged as follows: One group comprising bits 1, 2 and 8; a second comprising bits 4, A and B; and the third group comprising a combination of groups 1 and 2 with the parity bit C. Each of these three groups therefore comprises 3 elements of information and the determination of even parity for each of these three groups may therefore be performed in an identical way, the result of the third group providing at the same time the result of the whole system.

The circuits adapted to check each of these groups are all similar in operation, the description will therefore be limited to an explanation of the circuits for checking the group comprising bits 4, A and B.

Lines L4, LA, LB, respectively, are connected to the inputs of inverters I4, IA, IB. A signal develops at the output of I4 only if no other signal exists in the line L4. Likewise, a signal at the output of IA and IB indicates the absence of a signal respectively in lines LA and LB.

There are four possible combinations of signals 4, A, B, which provide an even number of pulses:

(1) The three signals 4, A, B exist simultaneously.
(2) Only signal 4 exists; A and B do not exist.
(3) Only signal A exists; 4 and B do not exist.
(4) Only signal B exists; 4 and A do not exist.

These four possibilities respectively correspond to four logical AND circuits e4AB, e'4, e'A, e'B. These logical circuits have three inputs connected either to line L4, LA, LB, or to the output of inverters I4, IA, IB. The outputs of these four AND circuits are connected to the four inputs of a logical OR circuit O4AB. At the output of this OR circuit, a signal develops only if the three signals 4, A, B, form an odd number. The input of inverter 14AB is connected to the output of OR circuit O4AB. A signal develops at the output of 14AB if signals 4, A, B, form an even number. The group of bit signals 1, 2 and 8 are processed in the same manner by means of a parity check device similar to that described for signals 4, A, B; a signal develops at the output of OR circuit O128 if the signals form an odd number and at the output of inverter I128 if the number is of even order.

The even parity of the group of signals 1, 2, 4, 8, A, B, C, is determined by means similar to the two preceding ones. There are four possible combinations of these signals that provide an odd count; namely:

(1) The three groups have odd counts, simultaneously, in other words 1, 2, 8 is odd, 4, A, B also and C exists.
(2) Only 1, 2, 8 is odd, 4, A, B is even, and C does not exist.
(3) Only 4, A, B, is odd, 1, 2, 8 is even, and C does not exist.
(4) Only C exists, 1, 2, 8 and 4, A, B being both even.

These four possibilities respectively correspond to four logical AND circuit Cii, Cip, Cpi and Cpp, the outputs of which are connected to the four inputs of logical OR circuit Oi. A signal develops at the output of Oi only if the total number of signals is odd, but the absence of signals at the output of Oi corresponds to the presence of a signal at the output of inverter Ii indicating an even number of signals, thus signifying the presence of an error. The signal available at the output terminal of inverter Ii may be used for stopping the reading device or for any other required function.

*Code Conversion With Odd Parity*

Figure 5A:
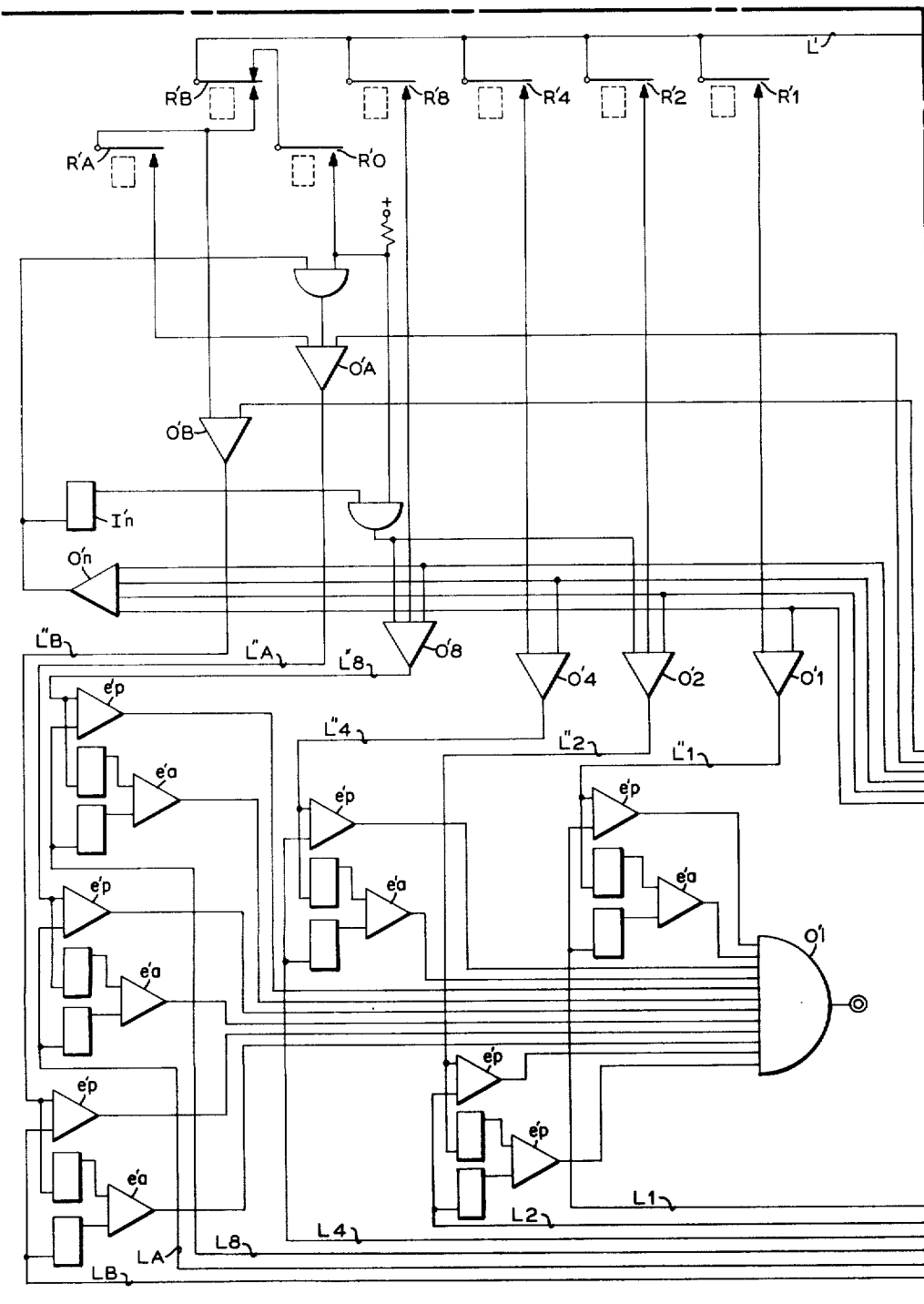
FIGS. 5a and 5b show a second embodiment of the coder and parity check of FIGS. 4d and 4e and may be substituted therefor.
Figure 5B:
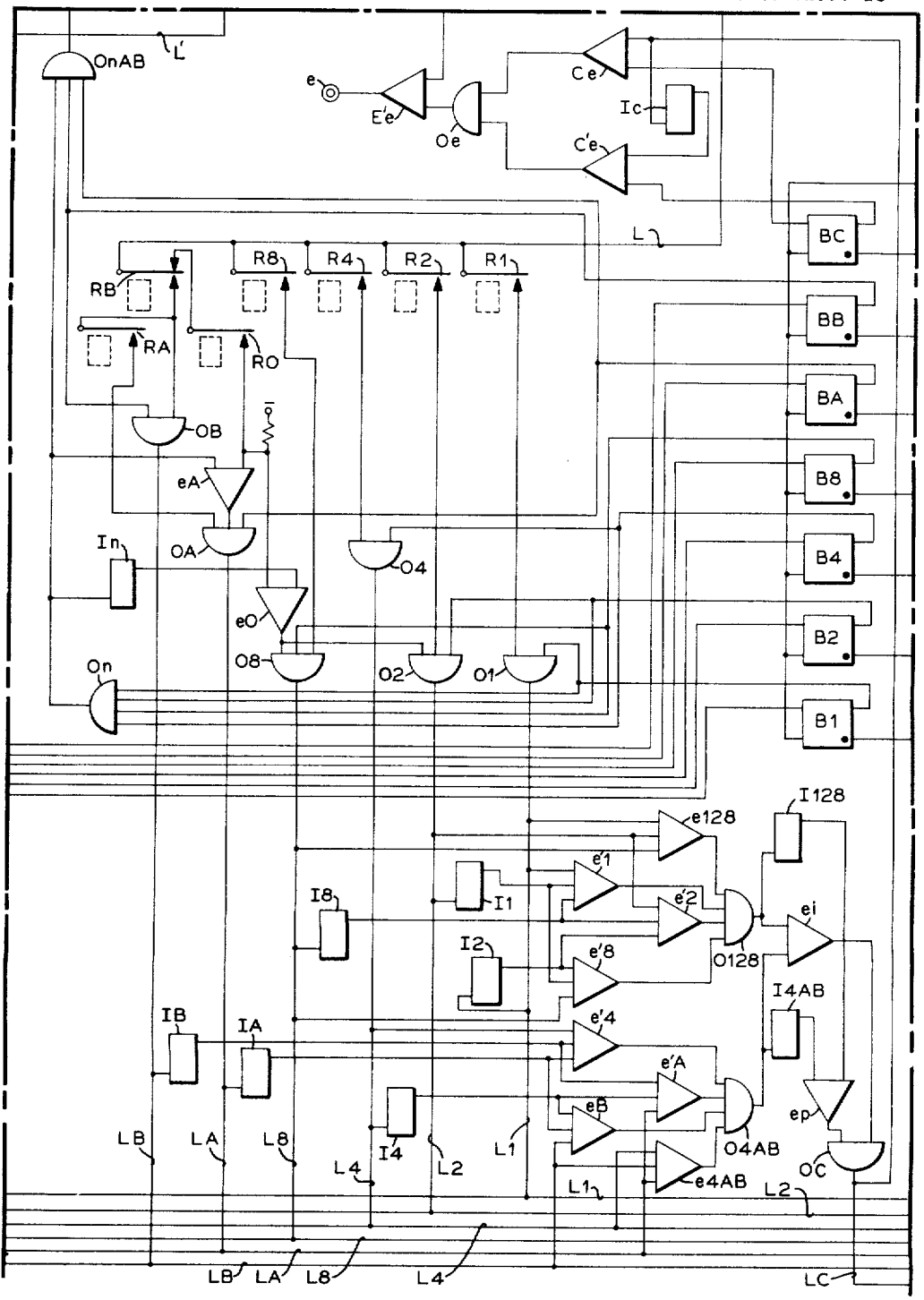

FIG. 18 indicates how FIGS. 4a through 4f are arranged to show the reading apparatus. FIG. 4d represents the parity check device and FIG. 4e the coding device. FIGS. 5a and 5b represent a second embodiment of the coder.

According to the first embodiment, the coder checks itself on the basis of an even parity count.

According to the second embodiment, the coder has a more general application, since it is able to change data recorded according to any 12 perforation code into data registered according to a 7 bit code.

The output of the brush set selection device (see corresponding paragraph) is connected through logical AND circuit EL and line L with the coder input (FIG. 5b). It is possible thereby during times tr and te to apply electronic signals from triggers Bm and B'm (i.e., from reading an intermediate memory m or m' to the coder). These signals indicate the presence of perforations in the scanned card row.

The coder also receives an information signal indicating which row is scanned. This information signal is developed by breakers R1, R2, R4, R8, R0, RA and RB. During times tl, tv, tr and te, the coder receives through the right outputs of triggers B1, B2, B4, B8, BA and BB, electronic signals from reading memory M, representing previously scanned perforations. During time tv, the even parity counts of these signals is verified. During time te, the first two signals are used to register the information recorded in the row being scanned into memory M, the third signal re-register into the principal memory data previously registered therein.

Breaker RB has two contacts—left (top) and right (bottom) contacts. RB right contact is normally open, the left contact is normally closed. Curves R1, R2, R4, R8, R0 and RA, in FIG. 6, indicate the time during which the right contact of breaker RB is closed. The following chart shows the closure timings of the breaker contacts for each of the card rows scanned.

| Card Rows Scanned | Breaker Contacts Closed |
| --- | --- |
| 9 | R8, R1, left contact of RB. |
| 8 | R8. |
| 7 | R4, R2, R1. |
| 6 | R4, R2. |
| 5 | R4, R1. |
| 4 | R4. |
| 3 | R2, R1. |
| 2 | R2. |
| 1 | R1. |
| 0 | R0, RA. |
| 11 | Right contact of RB. |
| 12 | R0, RA, right contact of RB. |

The coder also includes two logical AND circuits eA and eO, seven logical OR circuits O1, O2, O4, O8, OA, OB and On and an inverter In.

Readout signals from a selected intermediate memory m or m', which are to be registered into the memory M are applied through line Lm or L'm, to the reading amplifiers Am (or A'm), to AND circuit Em (or E'm) conditioned by trigger BL during the reading time to trigger Bm (or B'm), to the brush set selecting device, then to one input of logical AND circuits EL, the other input of which is energized during times tr and te. The output of this circuit EL is applied via line L to the upper contacts of breakers R1, R2, R4, R8 and to the common of RB shown in FIG. 5a. The lower contacts of R1, R2, R4, R8 are connected with one input of corresponding OR circuits O1, O2, O4, O8; RA lower contact is connected to one input of OR circuit OA. The right contact of RB is connected to one input of logical OR circuit OB and to the upper contact of breaker RA. RB left (top) contact is connected to the upper contact of R0. The lower contact of R0 is connected to one input of both logical AND circuits eA and eO. The lower contact of R0 receives a signal when a zero perforation has been sensed in the zero row of the card. This signal is translated into code 8 and 2 or into A, depending upon whether perforation 0 is unique or combined with another perforation previously scanned in the card column. Information stored in the memory M is read out into triggers B1, B2, B4, B8 to OR circuit On. A signal appearing at the output of OR circuit On, at zero time, in combination with a zero perforation causes the AND circuit eA, to provide an A signal on the line LA by way of OR circuit OA. On the other hand, the absence of signals at the output of OR circuit On while the zero row is scanned indicates that no perforation has been sensed during preceding read cycles. In such a case, the zero perforation is translated into 8 and 2 by means of AND circuit e0 and OR circuits O8 and O2. The reading signals from the memory M are applied, via lines L'1, L'2, L'4, L'8, L'A and L'B, to amplifiers A1, A2, A4, A8, AA and AB, to AND circuits E1, E2, E4, E8, EA and EB (conditioned by trigger BL during reading time), to triggers B1, B2, B4, B8, BA and BB, then into the coder to one input of corresponding OR circuits O1, O2, O4, O8, OA and OB.

Lines L1, L2, L4, L8, LA and LB connect the coder outputs of the OR circuits O1, O2, O4, O8, OA and OB to the memory M.

In FIG. 5b the presence of signals on lines L1, L2, L4, L8, LA and LB represents the information read out from the memory M.

If the parity count of these signals is even, the C bit signal must be included in order to render the parity count odd. The method employed for determining the inclusion of the parity bit C consists in dividing the six possible signals 1, 2, 4, 8, A and B into two groups, for example, 1, 2, 8 and 4, A, B, and producing a pulse for each group if the number of signals is odd, and, combining both these partial results if the total number of signals is even. This pulse is applied onto line LC to register C into memory M.

The inputs of inverters I1, I2 and I8 are respectively connected with lines L1, L2 and L8. A signal appears at the output of I1 if no signal exists on line L1. A signal at the output of I2 or I8 means there is no signal on lines L2 and L8, respectively.

There are four combinations whereby signals 1, 2, 8 constitute an odd number of pulses.

(1) The three signals exist simultaneously.
(2) Only signal 1 does exist, both others 2 and 8 being not existent.
(3) Only signal 2 does exist, both others 1 and 8 being not existent.
(4) Only signal 8 exists, both others 1 and 2 being not existent.

These four possibilities correspond to the four AND circuits e128, e'1, e'2, and e'8. These logical AND circuits have three inputs which are connected with either lines L1, L2 or L8, or with the outputs of inverters I1, I2 and I8. The outputs of these four AND circuits are connected with the four inputs of logical OR circuit O128. At this OR circuit output, there will appear a signal if signals 1, 2 and 8 make an odd number. The input of inverter I128 is connected to the output of OR circuit O128. There will appear a signal at the output of I128 if signals 1, 2 and 8 make an even number. For the group of signals 4, A and B, similar means are employed to determine odd parity. There will exist a signal at the output of OR circuit O4AB, if signals 4, A and B make an odd number, and at the output of inverter I4AB if this number is even. The combination of both groups provides even parity under the following possibilities:

(1) 1, 2, 8 and 4, A, B are odd—there will be a signal at the output of logical AND circuit ei, since both inputs of this circuit are connected to the outputs of O128 and O4AB.

(2) 1, 2, 8 and 4, A, B are even—there will be a signal at the output of logical AND circuit ep, since both inputs of this circuit are connected to the outputs of I128 and I4AB.

Both these possibilities are combined in OR circuit OC, both inputs of which are connected to the outputs of circuits ei and ep. There will appear a parity signal at the output of said OR circuit OC if the number of signals 1, 2, 4, 8, A and B is even, that is, if code C is to be registered. This signal is applied through line LC to memory M.

Other methods may be used to detect the parity of the six signals 1, 2, 4, 8, A and produce code C.

A method for verifying the validity of the C bit in the memory M consists of dividing the code bits into groups, for example, a first group 1, 2, 8; a second group 4, A and B, as in the first method, and then a third group comprising C and the partial results of both first and second groups. The parity count of the signals in this third group is determined by a device similar to those shown for the first two. A parity signal will appear at the output of this third device OR circuit if the number of signals is odd, indicating that the parity bit C is correct. If no signal appears, the number is even, and code C must be deleted.

According to another method, inverters I1, I2, I4, I8, IA and IB may be replaced by a second coder which produces signals inverse to those produced by the first one. Thus, this inverted coder (FIG. 5a) participates in determining code C and checking the first coder.

The inverted coder is provided with breakers, R'1, R'2, R'4, R'8, R'0, R'A and R'B (see FIG. 5a) having timing operations corresponding to the timings of coder breakers, R1, R2, R4, R8, R0, RA and RB shown in FIG. 5b.

All the logical OR circuits O1, O2, O4, O8, OA, OB and On of the coder, correspond to logical AND circuits O'1, O'2, O'4, O'8, O'A, O'B and O'n of the inverted coder. Similarly, other AND circuits are used in the inverted coder corresponding with the OR circuits used in the coder. In the inverted coder, the read signals from memory M are derived from the left outputs of triggers B1, B2, B4, B8, BA and BB instead of the right outputs which are used for the coder. In the same manner, the read signal from m (or m') derives from the left output of trigger Bm or B'm, through the brush set selecting device OR circuit E'L, the other input of which is connected to the left output of trigger BI, then, through line L', is applied to the inverted coder input.

The operation of the inverted coder is similar to that of the coder. The inverted coder output signals appear on lines L''1, L''2, L''4, L''8, L''A and L''B, corresponding to coder lines L1, L2, L4, L8, LA and LB. When a signal exists on line L1, no signal should appear on line L''1, and conversely to indicate a valid operation. The absence of signals on lines L1 and L''1, indicates an error. The simultaneous presence of signals is detected by logical AND circuit e'p, the simultaneous absence of signals by logical circuit e'a. An output signal from e'p or e'a means there is an error. The same operations and conditions hold when comparing lines L2 and L''2, L4 and L''4, L8 and L''8, LA and L''A, LB and L''B by means of other logical AND circuits similar to e'p and e'a. All signals indicating an incompatibility between both coders are gathered by means of twelve-input OR circuit O'i. At the output of O'i, the error signal may be used to bring the reading apparatus to a stop, or to control any other desired function.

The function of code C is to detect an error in a column of memory M when the number of recorded signals is even. For every row read out of the memory M, corresponding signals appear on the seven read lines L'1, L'2, L'4, L'8, L'A, L'B and L'C and are applied to triggers B1, B2, B4, B8, BA, BB and BC. The output signals from the first six triggers are applied to the coder input during times tz and tv, and pass through the coder unaltered.

From the coder outputs these signals are applied to the input of the code C producing device. During time $tv$, the corresponding signal from OR circuit OC is compared with code C, which is provided by trigger BC. If there is a signal at the output of OC, it means that the number of signals is even. If a signal appears at the left output of trigger BC, it means that code C did not exist. When both of these signals are coincidently applied to both inputs of logical AND circuit Ce, an error signal appears at Ce output. In the same manner, the existence of a signal at the output of inverter IC (the input of which is connected to OC output) means that the number of signals is odd, a signal appearing at the right output of trigger BC means that code C existed and the coincidence of both these signals at logical AND circuit C'e input produces an error signal. Both these error signals are applied to both inputs of OR circuit Oe connected to one input of an AND circuit E'e.

The other input of OR circuit E'e is connected with the right output of verification trigger Bv, an error signal is allowed to appear at the output of E'e during verification time $tv$, while the intermediate memory is inactive, thus code C produced by data read out from the memory M must correspond to code C indicated by BC.

At the output of the parity check circuit E'e, the error signal is applied to the error terminal $e$ and may be used, for example, to control operations of the reading apparatus.

Principal Memory Restoration

After the twelfth card reading cycle, all data punched in the scanned card will have been registered into the memory M. Circuits well known in the art but not shown, are provided to extract these data between the twelfth read cycle and the first read cycle of the following card.

All data previously registered into the memory M must be erased while the 9's row of the following card is passing under the read brushes and replaced by blanks so that all cores in the memory M will be restored to accept information read from the following card. The term restoration means that all cores are returned to the initial saturation state, which state indicates the absence of the data.

The regeneration of data in the memory M is controlled by breaker RM, which is shown in FIG. 4f and the contact closing time shown in FIG. 6 by curve RM. These contacts of this breaker are open during the 80 scanning cycles corresponding to the 9's row of the card and are closed the remaining time.

When breaker RM is closed, the plus high voltage is applied to the input of inverter CI as well as to an input terminal of logical AND circuits E1, E2, E4, E8, EA and EB. These logical circuits have three input terminals. The input terminal which is connected to the contact of breaker RM is energized the whole time except during the 80 scanning cycles corresponding to the 9's row. During read time $tl$, the read signals from memory M pass through amplifiers A1, A2, A4, A8, AA, AB and AC, logical OR circuit CO, through the AND circuits E1, E2, E4, E8, EA, EB, EC, through the triggers B1, B2, B4, B8, BA, BB and BC, through the coding device, to the code check device C, and then re-entered into M during time $te$ to complete a regeneration cycle.

During the 80 scanning cycles corresponding to the reading of the row of the 9's, the contacts of breaker RM are open, causing circuits E1, E2, E4, E8, EA and EB to be inactive to prevent regeneration in the memory M, and disabling the input of inverter CI. Under this condition, no signal will be read out from the memory M. This no-signal readout is interpreted as an even parity count; hence, a parity bit C must be generated in order to satisfy the validity check circuit. The generation of the parity bit C is accomplished by turning on the trigger BC for each of the 80 scanning cycles by means of the inverter CI, the OR circuit CO and the AND circuit EC. In the first version of the coder, BC being "ON," develops a signal in line LC, in the second version of that coder, it is the coder itself which develops the signal in line LC.

Selector Electronic Control

In this recording apparatus, selectors may be controlled by electronic pulses, for instance, by calibrated pulses from a number of triggers when a memory is read.

In the reading apparatus of the invention, the brushes are not connected to the control panel, the data sensed in the card are automatically registered in the buffer storage. However, the selectors are easily controlled, since all the signals corresponding to all perforations in the sensed card appear serially at trigger Bm, B'm right output on terminal DD' in FIG. 4c. The column and row where the perforation has been performed is determined by timing these signals. Thus, a selector may be controlled by a perforation being punched where a given row (or rows) crosses (or cross) a given column (or columns).

The row may be determined with the help of breaker contacts, for example, those of breakers RX and R'X which are shown on FIGS. 1 and 4c, their closing times being determined by RX curve in FIG. 6. RX and R'X contacts are made while rows 11 and 12 are scanned, and it is clear that it is possible to provide additional breakers, the contacts of which would close while a row or any combination of rows are scanned. In this example, RX determines rows 11 and 12. At terminal X signals appear which correspond to perforations in rows 11 or 12 of the card, whatever may be the column.

Also, it is possible to determine the row by means of a switch or a timer, including a common hub $pc$ which may be connected with output D (or D') of trigger Bm or B'm and twelve terminals or hubs $p1$, $p2$, $p3$, $p4$, $p5$, $p6$, $p7$, $p8$, $p9$, $p0$, $p11$ and $p12$. Said switch which may be any type—electronic, mechanical it is shown in FIG. 4a in the form of 12 terminals in a half-circle disposition, and a common central terminal. The switch is synchronized with the card advance movement and connects terminal $pc$ with each one of the twelve terminals, in a manner as follows: During the read cycle of the 9's row, common terminal $pc$ is connected to $p9$; during the 8's read cycle $pc$ is connected with $p8$, and so on. A read cycle comprises the scanning of a row, and the time elapsed until the next card row scanning. For example, there will appear a signal on terminal $p12$ in all columns wherein a punch in the 12's row has been sensed.

The column is located, because during each of the twelve card reading cycles, 80 pulses are sent in turn by the scanning chain $b1$, $b2$ to $b80$ and are available at the 80 hubs $1p$, $2p$, $3p$ to $80p$. The chain and hubs are designated by BAL in FIG. 1, and are symbolically shown in FIG. 4f as triggers $b1$, $b2$, $b3$ to $b79$ and $b80$ and hubs $1p$, $2p$, $3p$ to $79p$ and $80p$. At Bm (or B'm) output, each signal corresponds to a magnetic core in memory $m$ or $m'$, associated with one of the 80 read brushes and thus to one of the 80 card columns. This signal lasts during the corresponding scanning chain trigger operating time, since Bm and B'm are reset by the leading edge of the pulse corresponding to the operating time for each trigger of the chain. The scanning chain pulses permit identification of the brush which has sensed the perforation, that is, to determine the column where the perforation exists.

Row determining and column determining pulses are simultaneously applied by means of logical AND circuits. For example, in FIG. 1 there appears a signal at the output of logical AND circuit EX (one input of which is connected to terminal X, while the other is connected to hub $2b$) when a perforation has been sensed at the crossing of column 2 and rows 11 or 12.

In FIG. 4a, selector S12 is energized by a perforation sensed at the crossing of row 12 and column 2, whereas selector S11 is energized by the perforation sensed in row 11 column 2. Hub 2p which is the output of scanning b2, shown in FIG. 4, applies a signal to one input of both logical AND circuits E11 and E12. In order to prevent overloading the scanning trigger b2, a circuit is employed which includes two cathode followers, designated EF and E'F and shown in detail in FIG. 16a. This circuit is connected to the inputs of both AND circuits E11 and E12. E12 second input is connected with hub p12, E11 second input with p11, through flexible connections, shown in dotted lines in FIG. 4a. Two coincident signals at E12 inputs indicates a perforation in row 12, column 2, the signal at E12 output controls the thyratron device T12 which picks up the magnet of selector S12. Similarly, the signal from E11 output controls T11 and then S11.

It is also possible, by connecting two terminals, for instance p0 and p1 with an input of logical the AND circuit, and the output of scanning chain trigger bn with the other terminal, to pick up a selector by a perforation being performed at the crossing of column n and either row 0 or row 1. It is also possible to directly connect pc to an AND circuit input without using a switch, this second output is connected to one or more scanning chain triggers.

*Selector Hold*

FIGS. 17 and 17a represent symbolically and in detail an example of selector energization as well as its hold circuit. In this example, the selector winding is energized by a thyratron T, which receives a high voltage through breaker rt, the closing time of which is given by the curve rt in FIG. 6. The thyratron is controlled by transistors, but other means may be employed.

Besides control winding 1, the selectors may include a hold winding, the function of which is to hold contacts in a "transferred" position. In the example shown in FIG. 17a, holding winding 2 is connected to the high voltage through hold breaker rm contacts and one of the transferred contacts 1.1 of the selector.

An input signal applied to the control grid fires thyratron T; the contacts of breaker rs being closed (see curve rS in FIG. 6), selector winding 1 is energized. Contacts 1.1 close and when breaker rm closes (see curve rm in FIG. 6), hold winding 2 is subjected to a high voltage to place a selector in the "transferred" position. The selector remains transferred from the end of the twelfth reading cycle of a card until the beginning of the first reading cycle of the following card.

The hold device of selector S12 comprises trigger B12 logical AND circuit e12 and three terminals—unconditional pickup I12, latch V12 and unlatch D12 terminals. A pulse applied to terminal I12 passes through OR circuit O12 to energize selector S12. Trigger B12 receives on its right input through breaker RD, a pulse which is timed with the beginning of the card reading (see curve RD in FIG. 6). It is driven "ON" and a signal appears at the trigger right output. This signal will cease upon the application of a reset pulse to the trigger left terminal.

When terminals I12 and V12 are connected and the selector S12 is not energized, the selector remains "OFF," but once energized, it remains "ON" until an unlatching pulse is applied to terminal D12.

It may be seen that if a selector receives two pulses simultaneously, one for controlling the unlatching at terminal D12 and the other the energization at the output of AND circuit E12, the latter shall be operative.

*Group Control*

In order to distinguish the various groups of data punched in cards, group control perforations are used in a given zone of the cards. The group control device compares these perforations in two adjacent cards and determines if they are similar or not, that is, if they belong to the same group. The group control device comprises two devices, one for selecting the area wherein check perforations are performed and the other, for comparing these perforations. The signals from the output of these devices are combined with the inputs of AND circuits eM, eI or em, shown in FIG. 4b, to energize corresponding group control selectors SM, SI or Sm.

The information from reading both memories m and m' is applied through read wires Lm and L'm to amplifiers Am and A'm then to right input terminals for triggers Bm and B'm. A pulse occurring at Bm (or B'm) upper right output terminal indicates a sensed perforation, whereas a pulse at the left output terminal indicates the absence of a perforation. The comparison is effected by a logical "exclusive OR" circuit, the inputs of which are connected with the outputs of triggers Bm and B'm.

FIG. 4c shows two logical AND circuits e'r and e"r and a logical OR circuit Or. The output S1 of this OR circuit provides a pulse whenever corresponding perforations sensed in two adjacent cards are not identical. This pulse is amplified and then used to perform a number of functions.

As may be seen in FIG. 1, selected areas of the cards may be compared by connecting the output of the comparing device COMP to three terminals S1, S2 and S3, S1 being connected directly, S2 and S3 being connected through breaker contacts that may be closed while certain rows of the card are scanned. For example, considering S2, if the relay contacts are open while rows 0, 11 and 12 are scanned and closed while the numerical part is scanned, the comparison is effective only for rows 9 to 1.

In FIG. 4b, there are shown three card column selection devices DM, DI and Dm. These are used to select predetermined columns wherein major, intermediate and minor group perforations are recorded. The signal appearing at the output of each of these devices is coupled with the comparing device output pulse, to preserve the comparison results of a selected number of data columns. This is effected by applying the scanning chain pulses for these selected columns to the start and stop terminals of devices DM, DI and Dm. For each card row scanned, the output of a column selection device provides a signal, the leading edge of which will be coincident with the start column reading comparison signal, whereas the trailing edge will coincide with the stop column comparison. This signal is applied to one input of the logical AND circuits eM, eI or em. The output signal from comparing device COMP is applied to the other inputs of these circuits. When coincidently applied, both these signals will mean that a difference exists in the perforations of two adjacent cards, thus indicating a group control break.

Each one of these major (DM), intermediate (DI) or minor (Dm) devices is composed of three diode gates, one trigger bM, bI and bm, respectively, an OR circuit OM, OI and Om, respectively, and three or four input terminals bd, bf, ba and possibly bs. To render a device operation, the input terminals thereof are supplied with the following pulses:

(1) The pulse from the scanning chain last trigger is connected to terminal bf (in case the chain scanning begins in location 80, this pulse corresponds to location 1 of the chain) to indicate the end of the row scanning.

(2) The scanning chain pulse for the selected start column is connected to terminal bd.

(3) The scanning pulse for the selected stop column is connected to terminal ba.

(4) The pulse from the output of a high order device DM or DI is connected to terminal vs if such a control is desired.

The start pulse and the scanning chain advance pulse from the output of inverter I'a are applied to both inputs of a gate, then to the right input of the trigger which is switched "ON" during the trailing edge of inverter pulse I'a (see curve I'a in FIG. 7). The right output of this trigger supplies a signal having a time interval extending from the column next to the start column, to the stop column. Start terminals $bd$ and the output of triggers BM, BI and B$m$ are connected to logical OR circuits OM, OI and O$m$, respectively. Thus, the start column pulse and the signal corresponding to the "ON" state of trigger $b$M, $b$I or $bm$ are found again at the output of corresponding logical OR circuit OM, OI or O$m$, which establishes the selected number of card columns. When it is desired to preserve the comparing device result for one column, the scanning chain pulse for this column is applied to stop terminal $ba$.

To establish automatic group control operations, a minor control change is started automtically as soon as an intermediate control change is sensed; or a minor control change followed by an intermediate control change or initiated when a major control change is sensed. These controls are established by connecting the output of device DM with an input of OR circuit OI of device DI, and DI output with an input of OR circuit O$m$ of D$m$ (these connections are indicated in dotted lines in FIG. 4$b$).

Perforation Count Check

The perforation count device employs two counters. The first one is used to count the total number of perforations sensed by the first brush set. During the interval between the end of the first counting operation by the first brush set and the beginning of the counting operation of the same card by the second brush set, the perforation count value in the first counter is complemented and the coder is reset. The complemented value is transferred to the second counter, and, on the following card cycle, the number of perforations sensed by the second brush set is then added into the second counter. If the added count is free of any counting error, the second counter reaches its maximum count capacity. While the card is read by the second brush set, the first counter counts the number of perforations in the following card, so as to verify said following card when it passes by the second brush set.

The input signals that are applied to the counters are sent by read lines L$m$ and L'$m$, respectively, through amplifiers A$m$ and A'$m$ and triggers B$m$ and B'$m$. The perforation counters provide a check on the operation of the brushes, the intermediate (recording and reading) memories, the amplifiers including the triggers B$m$ and B'$m$.

The counters shown in FIG. 4$a$ are electronic binary-type counters, each comprising four triggers: C1, C2, C4, C8 and C'1, C'2, C'4, C'8, and each having a count capacity of 15. These triggers are different from the others herein described in that, besides both normal inputs, they have a third input shown in the middle of the lower side of the trigger representing square. A signal occurring at this input changes the operating state of the trigger. FIGS. 14 and 14$a$ represent a detailed view of an illustrative binary trigger.

The verification device timing is determined by cam breakers R$z$, R'$z$, R$t$ and R$v$ which respectively control the first counter reset, the second counter reset, the first-to-second counter transfer, and the output of the verification signal. Timings of these breakers are determined by curves R$z$, R'$z$, R$t$ and R$v$ in FIG. 6.

Before a card is advanced under brush set B, the triggers of the first counter are reset by a pulse provided by a positive voltage source through breaker R$z$ and applied to the left input terminals of triggers C1, C2, C4 and C8. Pulses from reading intermediate memory $m$ and corresponding to the perforations sensed by brushes B are applied to the binary input of the first trigger C1 of the first counter. The first pulse turns trigger C1 "ON," the second pulse will reset it; the pulse generated at the left output of C1 is applied to the binary input of C2; turning "ON" trigger C2, and so on, to count the perforation signals entered into the first counter.

When the whole card has been sensed by brush set B, the total number of the perforations can be determined (modulo 16) at the right outputs of C1, C2, C4, C8 and the 15's complement form is obtained at the left outputs of the same triggers. When the cam closes transfer breaker R$t$, a pulse is applied to one input of four logical AND circuits 1E, 2E, 4E and 8E, the other input of these circuits being connected to the left outputs of triggers C1, C2, C4 and C8. The four outputs of these AND circuits are connected with the right inputs of second counter triggers C'1, C'2, C'4 and C'8, so as to register therein the 15's complement form of the value representing the number of perforations sensed by the first brush set. When the card is sensed by the second brush set B'; the pulses from reading intermediate memory $m'$ are applied to the binary input of the second counter trigger C'1, where they are added to the complemented value, previously entered. When the whole card has been sensed by the second brush set, and, in the absence of any counting error, the numbers of perforations sensed by both brush sets must be identical, therefore the second counter will indicate a count value of 15, and, all four triggers C'1, C'2, C'4 and C'8 of the second counter will be "ON." However, if a signal occurs at the left output of one of them, it means that an error has been detected by the device. The left outputs of the four triggers connected to the four inputs of a logical OR circuit OE. The signal appearing at OE output is applied to one input of logical AND circuit $ev$. To the other input of circuit $ev$ there is applied a signal under control of breaker RV which before breaker R'Z resets second counter triggers C'1, C'2, C'4 and C'8. The signal from $ev$ output may be used to control the machine for any desired function. The perforation count device operation is controlled by means of breakers RZ, R'Z, RT and RV, the time diagrams of which are shown in FIG. 6 as curves RZ, R'Z, RT and RV.

Brush Set Selection

As previously described, the reading apparatus includes two scanning brush sets B and B', two intermediate memories $m$ and $m'$ and two read lines L$m$ and L'$m$, etc. Data to be registered in the principal memory M is selected from either the first brush set or the second brush set.

The brush set selecting device comprises two AND circuits ES and E'S, an inverter IS, an OR circuit OS, and a selection control device DS, all shown in FIG. 4$c$.

Device DS is similar in operation to devices DM, DI and D$m$ previously described. The right outputs of both triggers B$m$ and B'$m$ are connected an input of each logical AND circuits ES and E'S of the selector, so that ES output corresponds to the readout of intermediate memory $m$ and the output of E'S to memory $m'$. The output line from device DS is applied to the second input of ES, and to the inverter IS. The outputs of circuits ES and E'S are connected with both inputs of logical OR circuit OS. At the output of OR circuit OS, there will appear in turn all data to be applied to the coding device and to the principal memory M, said data being transmitted from one or the other of the intermediate memories $m$ and $m'$, depending upon which of the AND circuits ES or E'S is active.

In the embodiment of the reading apparatus, which comprises the coder and the inverse coder, the brush selecting device operates in a manner described, to select either trigger B$m$ or B'$m$, the right outputs of which are connected to the coding device and the left outputs are connected to the inverse coder. To choose between the left outputs of B$m$, the logical circuits ES, E'S and OS are duplicated.

Sensing of Blank Column and Multiple Perforations

The blank column sensing device is provided to sense the absence of perforations in the 80 columns of the scanned card, or, the presence of blanks in any of the 80 columns of principal memory M.

Multiple perforation sensing device senses card columns wherein two or more perforations exist and those memory M columns wherein data, represented by two or more perforations have been registered.

The data is supplied to both devices, first from intermediate memory by way of line L'', shown in FIGS. 4c and 4b, and then from memory M by way of the logical OR circuits On and OnAB. All numerical signals, read from memory M, by way of the read lines L'1, L'2, L'4 and L'8, and the output of triggers B1, B2, B4 and B8 are applied to OR circuit On. Other memory output signals appearing on lines L'A and L'B, are applied to the other inputs of OR circuit OnAB. During the scanning of a given row or column, a signal appearing at OnAB output indicates that a perforation had previously been sensed in this column and entered into M. The coincidence at the input of logical AND circuit EPM of this signal with a signal from wire L'' will indicate that, in this column, one more perforation has been sensed. Thus, a signal from the output of EPM indicates a column in which more than one perforation exists.

The absence of a signal at the output of OnAB, during the scanning of 11 of the 12 rows of the card, will indicate that no perforation had been entered into memory M. During the twelfth scanning cycle the continued absence of a signal upon line L'' will indicate that no perforation has been sensed in the 12's row of the card. The absence of a signal indicates a blank column and will be manifested by no signal at the output from OR circuit OCB and by a signal at the output of inverter ICB. Logical AND circuit ECB has one input connected to cam breaker R12 which is timed with the advance of the card so that the contact is open during the first eleven reading cycles of the card and closed during the twelfth cycle (see curve R12 in FIG. 6). The second ECB input is connected with the output of inverter ICB. When breaker R12 is closed, a positive voltage applied to one input of AND circuit ECB passes the blank column sensing signal to the output of ECB on the twelfth cycle.

The outputs from logical AND circuits EPM and ECB are applied to both inputs of logical OR circuit 0, at the output of which a signal will appear to indicate the presence of a column with more than one perforation or with no perforation.

Cam breaker RN, the contact of which is closed during the scanning of rows, 11 and 12 (see curve RN in FIG. 6), is provided in order that only multiple perforation sensing signals for the numerical area of the card are preserved. Cam breaker R''0, the contact of which is closed during the scanning of row 0 and open during the other reading cycles (see curve R''0 in FIG. 6), is used to apply a pulse at the input of circuit EN, so as to produce a signal at the input of EN only if there is a blank column in the numerical part of the card. At the output terminal N of OR circuit ON, a signal will develop only to indicate either a blank column or a multiple perforation column in the numerical rows of the card.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine of the type wherein a translated character is sequentially developed, means for serially sensing manifestations representing the bit positions of a first multiple bit code and providing corresponding first code bit signals, a translator having first and second inputs and an output, said translator including means for translating the first code bit signals into bit signals of the second code, said translator output providing a sequentially developed character determined jointly by signals appearing on said first and said second inputs, means for serially transmitting the bit manifestations sensed in said first code to said first input, a storage device for storing the bits of the second multiple bit code, means for transmitting character manifestations from said output to said storage device, means for simultaneously transmitting all the sequentially developed bit signals representative of said second multiple bit code from said storage device to said second input upon each transmission from the output of said translator to said storage device of a bit sensed in said first code at said first input whereby the sensing of a plurality of bits in said first code sequentially forms a corresponding character manifestation in said second code, parity counting means for counting the bit signals appearing on said translator output as the translated character is being sequentially developed, and parity bit generating means connected to said parity counting means and combining the parity bit with the character bit signals so that the final translated character contains the given parity count.

2. Apparatus according to claim 1 wherein said sensing means comprises means for simultaneously sensing corresponding bits of a plurality of characters, means for temporarily storing the corresponding bits of said plurality of characters, means for transmitting said corresponding bits in sequence, and wherein said given parity count is odd so that the finally developed characters have each an odd parity.

3. Apparatus for reading records of the type having columns of bit positions with corresponding bit positions of each column arranged in rows comprising a first sensing station for sensing a first record serially by rows and parallel by columns and providing first bit signals corresponding to the bits sensed in the first record, a second sensing station for simultaneously sensing a second record serially by rows and parallel by columns and providing second bit signals corresponding to the bits sensed in said second record, a first storage device for receiving and storing all the first bit signals sensed in a row of said first record at said first sensing station, a second storage device for receiving and storing all the second bit signals sensed in the corresponding row of said second record at said second sensing station, means for simultaneously advancing records through said sensing stations to enable corresponding rows of successive records to be simultaneously sensed at said first and said second sensing stations, means for serially reading out the bit signals stored in said first and said second storage devices in unison, a third storage device for storing a plurality of characters in a code different from the code of said records, a translator having first and second inputs and an output, means for sequentially transferring bit signals read out of said second storage device to said first input, means for transferring character manifesting signals from said third storage device to said second input upon the transfer of each bit signal from said second storage device, means for transferring translated data character signals appearing at said output to said third storage device, first and second binary-type counters respectively connected to said first storage device and said second storage device for counting the bit signals entered respectively into said first storage device and said second storage device, and error signaling means for issuing a character error signal when the count values in said counters are dissimilar.

4. Apparatus for cyclically feeding records sequentially therethrough and for reading said records of the type having columns of bit positions with corresponding bit positions of each column arranged in rows comprising a first sensing station for sensing a first record serially by rows and parallel by columns and providing first bit signals corresponding to the bits sensed in the first record, a second sensing station for simultaneously sensing a second record serially by rows and parallel by columns and providing second bit signals corresponding to the bits sensed, a first storage device comprising a single row of magnetic cores for receiving and storing all the first bit signals sensed in a row of said first record at said first sensing station, a second storage device comprising a single row of magnetic cores for receiving and storing all the second bit signals sensed in the corresponding row of said second record at said second sensing station, means for simultaneously advancing records through said sensing stations to enable corresponding rows of successive records to be simultaneously sensed at said first and said second sensing stations, means for serially reading out the stored bit signals from said first and said second storage devices in unison, a third storage device comprising a magnetic core array for storing bit signals representing a plurality of characters in a code different from the code of said records, a translator having first and second inputs and an output, said translator including means for translating the bit signals applied to both said first and said second inputs to bit signals of said different code, means for sequentially transferring bits read out of said second storage device to said first input of said translator, means for transferring character manifesting signals from said third storage device to said second input of said translator upon the transfer of each bit from said second storage device, means for transferring translated data appearing at said output to said third storage device, a first binary counter for counting the first bit signals, a second binary counter for counting the second bit signals, means operable after the sensing of the last row of a card for complementing the count value in said first counter and transmitting the complemented count value into said second binary counter prior to the sensing of said record on the next sequential feed cycle, and an error signaling means connected to said second counter and operable to issue an error when the count value in said counter is not at its maximum count capacity at the end of the feeding cycle.

References Cited in the file of this patent

UNITED STATES PATENTS

| | | |
|---|---|---|
| 2,512,038 | Potts | June 20, 1950 |
| 2,640,872 | Hartley | June 2, 1953 |
| 2,702,380 | Brustman | Feb. 15, 1955 |
| 2,837,278 | Schreiner | June 3, 1958 |
| 2,944,733 | Austin | July 12, 1960 |